United States Patent
Fernandez et al.

(10) Patent No.: US 7,073,711 B2
(45) Date of Patent: Jul. 11, 2006

(54) MOBILE HANDHELD CODE READER AND PRINT SCANNER SYSTEM AND METHOD

(75) Inventors: Frank E. Fernandez, Boynton Beach, FL (US); William G. Siegel, Wellington, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/419,093

(22) Filed: Apr. 21, 2003

(65) Prior Publication Data
US 2004/0016811 A1 Jan. 29, 2004

Related U.S. Application Data
(60) Provisional application No. 60/373,606, filed on Apr. 19, 2002.

(51) Int. Cl.
G06K 5/00 (2006.01)

(52) U.S. Cl. .................. 235/382; 235/380; 235/492; 705/18; 340/5.53

(58) Field of Classification Search .......... 235/382, 235/380, 492, 462.45; 705/18; 340/5.53; 382/115
See application file for complete search history.

(56) References Cited

U.S. PATENT DOCUMENTS

| | | | |
|---|---|---|---|
| 2,500,017 A | 3/1950 | Altman | |
| 3,200,701 A | 8/1965 | White | |
| 3,475,588 A | 10/1969 | McMaster | |
| 3,482,498 A | 12/1969 | Becker | |
| 3,495,259 A | 2/1970 | Rocholl et al. | |
| 3,527,535 A | 9/1970 | Monroe | |
| 3,540,025 A | 11/1970 | Levin et al. | |
| 3,617,120 A | 11/1971 | Roka | |
| 3,699,519 A | 10/1972 | Campbell | |
| 3,906,520 A | 9/1975 | Phillips | |
| 3,947,128 A | 3/1976 | Weinberger et al. | |
| 3,968,476 A | 7/1976 | McMahon | |
| 3,975,711 A | 8/1976 | McMahon | |
| 4,032,975 A | 6/1977 | Malueg et al. | |
| 4,063,226 A | 12/1977 | Kozma et al. | |
| 4,120,585 A | 10/1978 | DePalma et al. | |
| 4,152,056 A | 5/1979 | Swonger et al. | |

(Continued)

FOREIGN PATENT DOCUMENTS
EP 0 101 772 A1 3/1984

(Continued)

OTHER PUBLICATIONS
Btt (Biometric Technology Today), Finger technologies contacts, 2 pages.

(Continued)

*Primary Examiner*—Diane I. Lee
*Assistant Examiner*—Seung H Lee
(74) *Attorney, Agent, or Firm*—Sterne, Kessler, Goldstein & Fox P.L.L.C

(57) ABSTRACT

A scanner section of a reader/scanner device that scans and stores biometric data of an individual with a biometric scanner section. A reader section reads and stores machine readable code data with a code reading section. The machine readable code can be associated with a handheld device held by the individual having their biometric data scanned. The reader/scanner device then decodes the code data and stores decoded data. The biometric data is extracted, either within the reader/scanner device or remotely after being transmitted to a remote device. The extracted biometric data is compared to the decoded data, either within the reader/scanner device or remotely after the decoded data is transmitted to a remote device, to determine if the individual is the person listed on the handheld device. If not, the biometric data can be used to determine their identity if they are in a main database.

15 Claims, 14 Drawing Sheets

U.S. PATENT DOCUMENTS

| | | | |
|---|---|---|---|
| 4,209,481 A | 6/1980 | Kashiro et al. | |
| 4,210,889 A | 7/1980 | Holce | |
| 4,253,086 A | 2/1981 | Szwarcbier | |
| 4,322,163 A | 3/1982 | Schiller | |
| 4,414,684 A | 11/1983 | Blonder | |
| 4,537,484 A | 8/1985 | Fowler et al. | |
| 4,544,267 A | 10/1985 | Schiller | |
| 4,553,837 A | 11/1985 | Marcus | |
| 4,601,195 A | 7/1986 | Garritano | |
| 4,669,487 A | 6/1987 | Frieling | |
| 4,681,435 A | 7/1987 | Kubota et al. | |
| 4,684,802 A | 8/1987 | Hakenewerth et al. | |
| 4,701,772 A | 10/1987 | Anderson et al. | |
| 4,783,823 A | 11/1988 | Tasaki et al. | |
| 4,784,484 A | 11/1988 | Jensen | |
| 4,792,226 A | 12/1988 | Fishbine et al. | |
| 4,811,414 A | 3/1989 | Fishbine et al. | |
| 4,876,726 A | 10/1989 | Capello et al. | |
| 4,905,293 A | 2/1990 | Asai et al. | |
| 4,924,085 A | 5/1990 | Kato et al. | |
| 4,933,976 A | 6/1990 | Fishbine et al. | |
| 4,942,482 A | 7/1990 | Kakinuma et al. | |
| 4,946,276 A | 8/1990 | Chilcott | |
| 4,995,086 A | 2/1991 | Lilley et al. | |
| 5,054,090 A | 10/1991 | Knight et al. | |
| 5,067,162 A | 11/1991 | Driscoll, Jr. et al. | |
| 5,067,749 A | 11/1991 | Land | |
| 5,131,038 A | 7/1992 | Puhl et al. | |
| 5,146,102 A | 9/1992 | Higuchi et al. | |
| 5,157,497 A | 10/1992 | Topper et al. | |
| 5,185,673 A | 2/1993 | Sobol | |
| 5,187,747 A | 2/1993 | Capello et al. | |
| 5,210,588 A | 5/1993 | Lee | |
| 5,222,152 A | 6/1993 | Fishbine et al. | |
| 5,222,153 A | 6/1993 | Beiswenger | |
| 5,230,025 A | 7/1993 | Fishbine et al. | |
| 5,233,404 A | 8/1993 | Lougheed et al. | |
| 5,249,370 A | 10/1993 | Stanger et al. | |
| 5,253,085 A | 10/1993 | Maruo et al. | |
| 5,261,266 A | 11/1993 | Lorenz et al. | |
| 5,285,293 A | 2/1994 | Webb et al. | |
| 5,291,318 A | 3/1994 | Genovese | |
| D348,445 S | 7/1994 | Fishbine et al. | |
| 5,337,043 A * | 8/1994 | Gokcebay | 340/5.67 |
| 5,351,127 A | 9/1994 | King et al. | |
| D351,144 S | 10/1994 | Fishbine et al. | |
| 5,363,318 A | 11/1994 | McCauley | |
| 5,384,621 A | 1/1995 | Hatch et al. | |
| 5,412,463 A | 5/1995 | Sibbald et al. | |
| 5,416,573 A | 5/1995 | Sartor, Jr. | |
| 5,448,649 A | 9/1995 | Chen et al. | |
| 5,467,403 A | 11/1995 | Fishbine et al. | |
| 5,469,506 A | 11/1995 | Berson et al. | |
| 5,471,240 A | 11/1995 | Prager et al. | |
| 5,473,144 A | 12/1995 | Mathurin, Jr. | |
| 5,483,601 A | 1/1996 | Faulkner | |
| 5,509,083 A | 4/1996 | Abtahi et al. | |
| 5,517,528 A | 5/1996 | Johnson | |
| 5,528,355 A | 6/1996 | Maase et al. | |
| 5,548,394 A | 8/1996 | Giles et al. | |
| 5,591,949 A | 1/1997 | Bernstein | |
| 5,596,454 A | 1/1997 | Hebert | |
| 5,598,474 A | 1/1997 | Johnson | |
| 5,613,014 A | 3/1997 | Eshera et al. | |
| 5,615,277 A | 3/1997 | Hoffman | |
| 5,625,448 A | 4/1997 | Ranalli et al. | |
| 5,640,422 A | 6/1997 | Johnson | |
| 5,649,128 A | 7/1997 | Hartley | |
| 5,650,842 A | 7/1997 | Maase et al. | |
| 5,661,451 A | 8/1997 | Pollag | |
| 5,680,205 A | 10/1997 | Borza | |
| 5,689,529 A | 11/1997 | Johnson | |
| 5,717,777 A | 2/1998 | Wong et al. | |
| 5,729,334 A | 3/1998 | Van Ruyven | |
| 5,736,734 A | 4/1998 | Marcus et al. | |
| 5,745,684 A | 4/1998 | Oskouy et al. | |
| 5,748,766 A | 5/1998 | Maase et al. | |
| 5,748,768 A | 5/1998 | Sivers et al. | |
| 5,755,748 A | 5/1998 | Borza | |
| 5,757,278 A | 5/1998 | Itsumi | |
| 5,767,989 A | 6/1998 | Sakaguchi | |
| 5,778,089 A | 7/1998 | Borza | |
| 5,781,647 A | 7/1998 | Fishbine et al. | |
| 5,793,218 A | 8/1998 | Oster et al. | |
| 5,801,681 A | 9/1998 | Sayag | |
| 5,805,777 A | 9/1998 | Kuchta | |
| 5,809,172 A | 9/1998 | Melen | |
| 5,812,067 A | 9/1998 | Bergholz et al. | |
| 5,815,252 A | 9/1998 | Price-Francis | |
| 5,818,956 A | 10/1998 | Tuli | |
| 5,822,445 A | 10/1998 | Wong | |
| 5,825,005 A | 10/1998 | Behnke | |
| 5,825,474 A | 10/1998 | Maase | |
| 5,828,773 A | 10/1998 | Setlak et al. | |
| 5,832,244 A | 11/1998 | Jolley et al. | |
| 5,848,231 A | 12/1998 | Teitelbaum et al. | |
| 5,855,433 A | 1/1999 | Velho et al. | |
| 5,859,420 A | 1/1999 | Borza | |
| 5,859,710 A | 1/1999 | Hannah | |
| 5,862,247 A | 1/1999 | Fisun et al. | |
| 5,867,802 A | 2/1999 | Borza | |
| 5,869,822 A | 2/1999 | Meadows, II et al. | |
| 5,872,834 A | 2/1999 | Teitelbaum | |
| 5,892,599 A | 4/1999 | Bahuguna | |
| 5,900,993 A | 5/1999 | Betensky | |
| 5,907,627 A | 5/1999 | Borza | |
| 5,920,384 A | 7/1999 | Borza | |
| 5,920,640 A | 7/1999 | Salatino et al. | |
| 5,928,347 A | 7/1999 | Jones | |
| 5,942,761 A | 8/1999 | Tuli | |
| 5,946,135 A | 8/1999 | Auerswald et al. | |
| 5,960,100 A | 9/1999 | Hargrove | |
| 5,973,731 A | 10/1999 | Schwab | |
| 5,974,162 A | 10/1999 | Metz et al. | |
| 5,987,155 A | 11/1999 | Dunn et al. | |
| 5,991,467 A | 11/1999 | Kamiko | |
| 5,995,014 A | 11/1999 | DiMaria | |
| 5,999,307 A | 12/1999 | Whitehead et al. | |
| 6,018,739 A | 1/2000 | McCoy et al. | |
| 6,023,522 A | 2/2000 | Draganoff et al. | |
| 6,038,332 A | 3/2000 | Fishbine et al. | |
| 6,041,372 A | 3/2000 | Hart et al. | |
| 6,055,071 A | 4/2000 | Kuwata et al. | |
| 6,064,398 A | 5/2000 | Ellenby et al. | |
| 6,064,753 A | 5/2000 | Bolle et al. | |
| 6,064,779 A | 5/2000 | Neukermans et al. | |
| 6,072,891 A | 6/2000 | Hamid et al. | |
| 6,075,876 A | 6/2000 | Draganoff | |
| 6,078,265 A | 6/2000 | Bonder et al. | |
| 6,088,585 A | 7/2000 | Schmitt et al. | |
| 6,097,873 A | 8/2000 | Filas et al. | |
| 6,104,809 A | 8/2000 | Berson et al. | |
| 6,115,484 A | 9/2000 | Bowker et al. | |
| 6,122,394 A | 9/2000 | Neukermans et al. | |
| 6,144,408 A | 11/2000 | MacLean | |
| 6,150,665 A | 11/2000 | Suga | |
| 6,154,285 A | 11/2000 | Teng et al. | |
| 6,162,486 A | 12/2000 | Samouilhan et al. | |
| 6,166,787 A | 12/2000 | Akins et al. | |
| 6,178,255 B1 | 1/2001 | Scott et al. | |
| 6,195,447 B1 | 2/2001 | Ross | |

| | | | |
|---|---|---|---|
| 6,198,836 B1 | 3/2001 | Hauke | |
| 6,204,331 B1 | 3/2001 | Sullivan et al. | |
| 6,219,439 B1 * | 4/2001 | Burger | 382/115 |
| 6,246,751 B1 * | 6/2001 | Bergl et al. | 379/67.1 |
| 6,259,108 B1 | 7/2001 | Antonelli et al. | |
| 6,272,562 B1 | 8/2001 | Scott et al. | |
| 6,281,931 B1 | 8/2001 | Tsao et al. | |
| 6,327,047 B1 | 12/2001 | Motamed | |
| 6,347,162 B1 | 2/2002 | Suzuki | |
| 6,404,862 B1 * | 6/2002 | Holt | 379/93.02 |
| 6,505,193 B1 * | 1/2003 | Musgrave et al. | 707/3 |
| 6,744,910 B1 | 6/2004 | McClurg et al. | |
| 2002/0021827 A1 | 2/2002 | Smith | |
| 2002/0030581 A1 * | 3/2002 | Janiak et al. | 340/5.53 |
| 2002/0030668 A1 | 3/2002 | Hoshino et al. | |

FOREIGN PATENT DOCUMENTS

| | | |
|---|---|---|
| EP | 0 308 162 A2 A3 | 3/1989 |
| EP | 0 379 331 A1 | 7/1990 |
| EP | 0 623 890 A2 A3 | 11/1994 |
| EP | 0 653 882 A1 | 5/1995 |
| EP | 0 379 333 B1 | 7/1995 |
| EP | 0 889 432 A2 A3 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | 62-212892 A | 9/1987 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 A | 8/1999 |
| JP | 11-289421 A | 10/1999 |
| WO | WO 87/02491 A1 | 4/1987 |
| WO | WO 90/03620 A1 | 4/1990 |
| WO | WO 92/11608 A1 | 7/1992 |
| WO | WO 94/22371 A2 A3 | 10/1994 |
| WO | WO 96/17480 A2 A3 | 6/1996 |
| WO | WO 97/29477 A1 | 8/1997 |
| WO | WO 97/41528 A1 | 11/1997 |
| WO | WO 98/09246 A1 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 A1 | 8/1999 |

OTHER PUBLICATIONS

Drake, M.D. et al., "Waveguide hologram fingerprint entry device," *Optical Engineering*, vol. 35, No. 9, Sep. 1996, pp. 2499–2505.

Roethenbaugh, G. (ed.), *Biometrics Explained*, 1998, ICSA, pp. 1–34.

*Automated Identification Systems*(visited May 20, 1999) <http://www.trw.com/isystems/bldgaccess2.htm>, 1 page, Copyright 1999.

*Ultra–Scan Corporation Home Page*(visited May 20, 1999) <http://www.ultra-scan.com/index.htm>, 3 pages. (discusses technology as early as 1996).

*Profile*(last updated Aug. 16, 1998) <http://www.dermalog.deBritain/Profile/profile.htm>, 3 pages. (discusses technology as early as 1990).

*ID–Card System Technical Specifications*(last updated Jul. 18, 1998) <http://dermalog.de/Britain/Products/ID–Card/idcard2.htm>, 2 pages.

*Fujitsu Limited Products and Services*(updated Apr. 21, 1999) <http://www.fujitsu.co.jp/hypertext/Products/index–e.html>, 3 pages, Copyright 1995–1999.

*SonyDCam*(visited May 20, 1999) <http://www.microsoft.com/DDK/ddkdocs/Win2k/sonydcam.htm>, 3 pages, Copyright 1999.

*Verid Fingerprint Verification*(visited May 17, 1999) <http://www.tssi.co.uk/products/finger.htm>, 2 pages.

*Startek's Fingerprint Verification Products: Fingerguard FG–40*(visited May 18, 1999) <http://www.startek.com.tw/product/fg40/fg40.htm>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future Is Now", www.securitymagazine.com, May 1999, pp. 25–26.

*Mytec Technologies Gateway*, (visited Apr. 27, 1999) <http://www.mytec.com/Products/gateway/>, 1 page.

*Mytec Technologies Gatway: Features & Benefits*, (visited Apr. 27, 1999) <http://www.mytec.com/Products/gateway/features.htm>, 1 page.

*Mytec Technologies Touchstone Pro*, (visited Apr. 27, 1999) <http://www.mytec.com/Products/Touchstone/>, 1 page.

*Mytec Technologies Touchstone Pro: Features*, (visited Apr. 27, 1999) <http://www.mytec.com/Products/Touchstone/features.htm>, 1 page.

*Electronic Timecock Systems and Biometric Readers*(last updated Apr. 17, 1999) <http://www.lfs–hr–bene.com/tclocks.html>, 1 page.

*Fingerprint Time Clock*(visited May 17, 1999) <http://www.lfs–hr–bene.com/Biometrics/Fingerprintclock.html>, 6 pages.

*KC–901: The KSI fingerprint sensor*(visited May 17, 1999) <http://www.kinetic.bc.ca/kc–901.html>, 3 pages.

*Intelnet Inc.*(visited May 20, 1999) <http://www.intelgate.com/index.html>, 1 page, Copyright 1996.

*Ver–i–Fus Fingerprint Access Control System*(visited May 20, 1999) <http://www.intelgate.com/verifus.htm>, 2 pages. (Ver–i–fus product released in 1995).

*Ver–i–fus®Configurations*(visited May 20, 1999) <http://www.intelgate.com/verconfig.htm>, 1 page. (Ver–i–fus product released in 1995).

*Ver–i–Fus®& Ver–i–Fus$^m$®*(visited May 20, 1999) <http://www.intlgate.com/vif_data.htm>, 3 pages. (Ver–i–fus product released in 1995).

*Access Control System Configurations*(visited May 20, 1999) <http://www.intelgate.com/access.htm>, 2 pages. (Ver–i–fus product released in 1995).

*Company*(visited May 17, 1999) <http://www.instainfo.com.company.htm>, 2 pages.

*TouchLock™II Fingerprint Indentity Verification Terminal*(visited May 17, 1999) <http://www.identix.com/TLock.htm>, 4 pages.

*Physical Security and Staff Tracking Solutions*(visited May 17, 1999) <http://www.identix.com/products/biosecurity.html>, 3 pages, Copyright 1996–1998.

*Veriprint2000 Fingerprint Verification Terminal For Use With Jantek Time & Attendance Software*(visited May 17, 1999) <http://www.hunterequipment.com/fingerprint.htm>, 2 pages.

*Veriprint Product Applications*(visited Apr. 27, 1999) <http://www.biometricid.com/uses.htm>, 1 page, Copyright 1999.

*BII Home Page*(visited Apr. 27, 1999) <http://www.biometricid.com/homepage.htm>, 1 page, Copyright 1999.
*Veriprint 2100 Stand–Alone Fingerprint Verification Terminal*(visited Apr. 27, 1999) <http://www.biometricid.com/veriprint2100.htm>, 3 pages.
Randall, N., "A Serial Bus on Speed," PC Magazine, May 25, 1999, pp. 201–203.
*The Dermalog Check–ID*(visited Nov. 12, 1999) <http://www.dermalog.de/ganzneu/products_check.html>, 1 page.
*Check–ID Specifications and Features*(visited Nov. 12, 1999) <http://www.dermalog.de/ganzneu/spec_check.html>, 1 page, Copyright 1999.
*Startek's Fingerprint Verification Products: FingerFile 1050*(visited Oct. 8, 1999) <http://www.startek.com.tw/product/ff1050.html>, 3 pages.
*Time Is Money!*(visited Jun. 5, 1998) <http://ww.iaus.com/afim.htm>, 3 pages.
*LS 1 LiveScan Booking Workstation High Performance Finger & Palm Scanning System*(visited Jun. 4, 1998) <http://www.hbs–jena.com/ls1.htm>, 6 pages, Copyright 1998.
*Welcome to the Homepage of Heimann Biometric Systems GMBH*(visited Jun. 4, 1998) <http://www.hbs–jena.com/>, 1 page, Copyright 1998.
*Heimann Biometric Systems Corporate Overview*(visited Jun. 4, 1998) <http://www.hbs–jena.–com/company.htm>, 4 pages, Copyright 1998.
*Remote Access Positive IDentification –raPID*(visited Jun. 3, 1998) <http://www.nec.com/cgi–bin/showproduct.exe?pro...emote+Access+Positive+IDentification+%2D+raPID>, 2 pages, Copyright 1997.
*Morpho DigiScan Cellular*(visited Jun. 3, 1998) <http://www.morpho.com/products/law—enforcement/digiscan/cellular.htm>, 2 pages, Copyright 1998.
*A.F.I.S.* (last updated Apr. 2, 1998) <http://www.dermalog.de/afis.htm≦, 2 pages.
*Morpho FlexScan Workstation*(visited Jun. 3, 1998) <http://www.morpho.com/products/law_enforcement/flexscan/>, 2 pages, Copyright 1998.
True–ID®The LiveScan with specialty "ability". . . , 2 pages.
*Printrak International: User List*(visited Jun. 3, 1998) <http://www.printrakinternational.com and link>, 10 pages, Copyright 1996.
*Live–Scan Products: Tenprinter®1133S*(visited Apr. 23, 1999) ≦http://www.digitalbiometrics.com/Products/tenprinter.htm≦, 4 pages. (Tenprinter 1133S released in 1996).
*TouchPrint™600 Live–Scan System*(visited Nov. 17, 1999) <http://www.identix.com/products/livescan.htm>, 4 pages, Copyright 1996–1998.
Systems for Live–Scan Fingerprinting, Digital Biometrics, Inc., 8 Pages, Copyright 1998.
DBI FingerPrinter CMS, Digital Biometrics, Inc., 5 Pages. (CMS released in 1998).
Fingerscan V20, Indentix Incorporated, 1 page, Copyright 1999.
Verid Fingerprint Reader, TSSI, 4 pages.
Response to Request for Information, Cross Match Technologies, Inc., 13 pages, Apr. 14, 1999.
*Startek's Fingerprint Verification Products*(visited Nov. 17, 1999) >http://www.startek.com.tw/product/index.html≦, 1 page.

*Introduction to Startek's Fingerprint Verification Products*(visited Nov. 17, 1999) <http://www.startek.com.tw/product/index2.html<, 2 pages.
*Automatic Fingerprint Identification Systems*(visited Nov. 17, 1999) <http://www.sagem.com/en/produit4–en/empreinte–dig–en.htm>, 1 page.
*Digital Biometrics Corporate Information*(visited Nov. 17, 1999) <http://www.digitalbiometrics.com/Corporate_info/Corporate_info.htm>, 2 pages. (discusses technology as early as 1985).
*DBI Live–Scan Products: Digital Biometrics TENPRINTER*(visited Nov. 17, 1999) <http://www.digitalbiometrics.com/products/tenprinter.htm>, 4 pages. (Tenprinter released in 1996).
*DBI Live–Scan Products: Networking Options (visited Nov. 17, 1999) <http://www.digitalbiometrics.com/products/networking_options.htm>, 3 pages.
*DBI Live–Scan Products: Digital Biometrics FingerPrinter CMS*(visited Nov. 17, 1999) <http://www.digitalbiometrics.com/products/FingerPrinterCMS.htm>, 3 pages (CMS released in 1998).
*DBI Live–Scan Products: Image Printer Stations*(visited Nov. 17, 1999) <http://www.digitalbiometrics.com/products/imageprinter.htm>, 2 pages.
*DBI Live–Scan Products: FC–21 Fingerprint Capture Station*(visited Nov. 17, 1999) <http://www.digitalbiometrics.com/products/Fingerprintcapture.htm>, 2 pages. (Scanner released in 1996).
*Series 400 OEM Scanner*(visited Nov. 17, 1999) <http://www.ultra–scan.com/400.htm>, 3 pages. (Scanner released in 1996).
*USC Scanner Design*(visited Nov. 17, 1999) <http://www.ultra–scan.com/scanner.htm>, 4 pages. (Scanner released in 1996).
*Series 500/600 Scanners*(visited Nov. 17, 1999) <http://www.ultra–scan.com/500.htm>, 3 pages. (Scanner released in 1996).
*Series 700 ID Station*(visited Nov. 17, 1999) <http://www.ultra–scan.com/700.htm>, 3 pages. (Scanner released in 1998).
*Identix: The Corporation*(visited Nov. 17, 1999) <http://www.identix.com/corporate/home.htm>, 2 pages, Copyright 1996–1998.
*Biometrix Imaging Products*(visited Nov. 17, 1999) <http://www.identix.com/products/bioimage.htm>, 1 page, Copyright 1996–1998.
*TouchPrint™ 600 Live–Scan System*(visited Apr. 23, 1999) <http://www.identix.com/products/livescan.htm>, 4 pages, Copyright 1996–1998.
*TouchPrint™ 600 Palm Scanner*(visited Nov. 17, 1999) <http://www.identix.com/products/palmscan.htm>, 3 pages, Copyright 1996–1998.
*TouchPrint™ 600 Card Scan System*(visited Nov. 17, 1999) <http://www.identix.com/products/cardscan.htm>, 3 pages, Copyright 1996–1998.
*Dermalog Key –The safest and easiest way of access control*(Last updated Jul. 18, 1998) <http://www.dermalog.de/Britain/Products/Key/key.htm>, 1 pages.
*Dermalog Finger–ID Your small size solution for high security*(Last updated Jul. 18, 1998) <http://www.dermalog.de/Britain/Products/Finger/fingerid.htm>, 1 page.
*Mytec: Corporate*(visited Nov. 17, 1999) >http://www.mytec.com/corporate/≦, 2 pages.

*Kinetic Sciences Inc. Fingerprint Biometrics Division*(visited Nov. 17, 1999) <http://www.kinetic.bc.ca/main–FPB.html>, 1 page.
*Fingerprint Biometrics: Securing The Next Generation*, May 19, 1999 (visited Nov. 17, 1999) <http://www.secugen.com/pressrel.htm>, 2 pages.
*Secugen Unveils Fully Functional Fingerprint Recognition Solutions*, May 11, 1999 (visited Nov. 17, 1999) <http://www.secugen.com/pressrel.htm>, 3 pages.
*POLLEX Technology Ltd., The Expert in Fingerprint Identification*–POLLog (visited Nov. 17, 1999) <http://www.pollex.ch/english/products/pollog.htm>, 2 pages.
*Sony Fingerprint Identification Terminal*(visited Nov. 17, 1999) <http://www.isoftware.com/biosols/sony/fiu/applications/fit100.htm>, 2 pages.
*Sony Fingerprint Identification Unit (FIU–700)*(visited Nov. 17, 1999) <http://www.iosoftware.com/biosols/sony/fiu 70/index.htm>, 2 pages. (Unit available late 1999).
*Sony Fingerprint Identification Unit*(visited Nov. 17, 1999) <http://www.iosoftware.com/biosols/sony/flu/index.htm>, 3 pages.
*Fujitsu Fingerprint Recognition Device (FPI–550)*(visited Nov. 17, 1999) <http://www.iosoftware.com/biosols/fujitsu/fpi550.htm>, 2 pages.
*Mitsubishi MyPass LP–1002*(visited Nov. 17, 1999) <http://www.iosoftware.com/biosols/mitsubishi/mypass.htm>, 2 pages.
*SecureTouch PV –A Personal "Password Vault"* (visited Nov. 17, 1999) <http://ww.biometricaccess.com/securetouch_pv.htm>, 1 page.
*Digital Descriptor System, Inc.–Profile*(visited Nov. 17, 1999) <http://www.ddsi–cpc.com/pages/profile.html>, 3 pages.
*Press Release: Printrak Internationa Announces New Portable Fingerprint ID Solution*, Dec. 10, 1996, (visited Nov. 17, 1999) <http://www.scott.net/~dg/25.htm>, 3 pages.
*Corporate Profile*(visited Nov. 17, 1999) <http://www.printrakinternational.com/corporate.htm>, 1 page.
*Printrak Products*(visited Nov. 17, 1999) <http://ww.printrakinternational.com/Products.htm>, 1 page.
Verifer™ ®Fingerprint Capture Devices, Cross Match Technologies, Inc., 2 pages, 1996–1997.
Verifier 200 Direct Fingerprint Reader, Cross Check Corporation, 2 pages, 1996–1997.
Verifier™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Verifier™ 500 Fingerprint Capture Devices, Cross Match Technologies, Inc., 2 pages, 1998.
Biometric terminal, 1 page.
10–Print Imaging System, Cross Check Corporation, 2 pages, 1998.
*Cross Match Technologies, Inc.*(visited Mar. 25, 1999) <http://www.crossmatch.net>, 1 page.
*Cross Match Technologies, Inc. –Products Overview*(visited Mar. 25, 1999) <http://www.crossmatch.net/new/products/product–index.html>, 1 page.
*Cross Match Technologies, Inc. –Law Enforcement Systems*-(visited Mar. 25, 1999) <http://www.crossmatch.net/new/law/law–index.html>, 2 pages.
*Cross Match Technologies, Inc. –Commercial Systems: Building On The Standard*(visited Mar. 25, 1999) <http://www.crossmatch.net/new/commercial/commerial–index.html>, 2 pages.
*Cross Match Technologies, Inc. –International Sales*(Mar. 25, 1999) <http://www.crossmatch.net/new/sales/sales–indes.html>, 1 page.
*Cross Match Technologies, Inc. –Support*(visited Mar. 25, 1999) <http://www.crossmatch.net/new/support/support–index.html>, 1 page.
*Cross Match Technologies, Inc. –News –Press Releases – Verifier 400 Press Release*(visited Mar. 25, 1999) <http://www.crossmatch.net/new/news/news–pr–050798html>, 1 page.
*Global Security Fingerscan™ System Overview*(visited Jan. 11, 2000) <http://wwwu–net.com/mbp/sol/g/a9.htm>, 12 pages.
"Command Structure for a Low–Cost (Primitive) Film Scanner,"*IBM Technical Disclosure Bulletin*, IBM Corp., vol. 35, No. 7, Dec. 1992, pp. 113–121.
Fingerprint Scan API Toolkit Version 1.x Feature List (Apr. 26, 2000) <http://www.mentalix.com/api/archive_fapivl.htm>, 3 pages.
"Image Acquisition System,"*IBM Technical Disclosure Bulletin*, IBM Corp. vol. 29, No. 5, Oct. 1986, pp. 1928–1931.
Kunzman, Adam J. and Wetzel, Alan T., "1394 High Performance Serial Bus: The Digital Interface for ATV,"*IEEE Transaction on Consumer Electronics*, IEEE, vol. 41, No. 3, Aug. 1995, pp. 893–900.
*Mentalix Provides The First IAFIS–Certified Latent Print Scanning Solution for Wondows®(Jul. 23, 1999) <http://www.mentalix.com/pressreleases/fprintplook3_prel.htm>*, 2 pages.
Sluijs, F. et al., "An On–chip USB–powered Three–Phase Up/down DC/DC Converter in a Standard 3.3V CMOS Process,"*2000 IEEE International Solid–State Circuits Conference*, IEEE, Feb. 9, 2000, pp. 440–441.
Venot, A. et al., "Automated Comparison of Scinitigraphic Images,"*Journal of Nuclear Medicine*, vol. 27, No. 8, Aug. 1986, pp. 1337–1342.
English–language Abstract for Japanese Patent Publication No. 59–103474, published Jun. 14, 1984, printed from espacenet.com, 1 page.
English–language Abstract for Japanese Patent Publication No. 62–212892, published Sep. 18, 1987, printed from espacenet.com, 1 page.
English–language Abstract for Japanese Patent Publication No. 1–205392, published Aug 17, 1989, printed from espacenet.com, 1 page.
English–language Abstract for Japanese Patent Publication No. 3–161884, published Jul. 11, 1991, printed from espacenet.com, 1 page.
English–language Abstract for Japanese Patent Publication No. 3–194674, published Aug. 26, 1991, printed from espacenet.com, 1 page.
English–language Abstract for Japanese Patent Publication No. 3–194675, published Aug. 26, 1991, printed from espacenet.com, 1 page.
English–language Abstract for Japanese Patent Publication No. 10–079017, published Mar. 24, 1998, printed from espacenet.com, 1 page.

English–language Abstract for Japanse Patent Publication No. 10–262071, published Sep. 29, 1998, printed from espacenet.com, 1 page.

English–language Abstract for Japanese Patent Publication No. 11–167630, published Jun. 22, 1999, printed from espacenet.com, 1 page.

English–language Abstract for Japanese Patent Publication No. 11–225272, published Aug. 17, 1999, printed from espacenet.com, 1 page.

English–language Abstract for Japanese Patent Publication No. 11–252489, published Sep. 17, 1999, printed from espacenet.com, 1 page.

English–language Abstract for Japanese Patent Publication No. 11–289421, published Oct. 19, 1999, printed from espacenet.com, 1 page.

* cited by examiner

US 7,073,711 B2

MOBILE HANDHELD CODE READER AND PRINT SCANNER SYSTEM AND METHOD

RELATED APPLICATIONS

This application claims priority under 35 U.S.C. 119(e) to U.S. Prov. Appl. No. 60/373,606, filed Apr. 19, 2002, which is incorporated be reference herein in its entirety.

BACKGROUND OF THE INVENTION

1. Field of the Invention

The present invention relates generally to biometrics.

2. Related Art

Biometrics are a group of technologies that provide a high level of security. Fingerprint capture and recognition is an important biometric technology. Law enforcement, banking, voting, and other industries increasingly rely upon fingerprints as a biometric to recognize or verify identity. See, *Biometrics Explained*, v. 2.0, G. Roethenbaugh, International Computer Society Assn. Carlisle, Pa. 1998, pages 1–34 (incorporated herein by reference in its entirety). Handheld, mobile print scanners have been used to capture a fingerprint. Such a print scanner can be held by an individual and carried around to allow fingerprint capture at a variety of locations. Conventional finger print scanners have been limited to fingerprint capture. Often times, captured prints were stored for later download. An official using such a handheld scanner may detect a print of another person, but could not readily verify the person's identity in real time. In those situations, prints were downloaded and transmitted to another device for extracting and matching processes.

Therefore, a handheld system is needed that allows a user to readily verify a person's identity in real-time without having to forward captured print information to a remote device for extract and match processing.

SUMMARY OF THE INVENTION

Embodiments of the present invention provide a system including a handheld identification device including a code and a handheld, mobile reading and scanning device, said reading and scanning device including a code reader that reads said code and a biometric reader that captures a biometric image of an individual holding said handheld device.

Embodiments of the present invention include a mobile handheld biometric security device including a code reader that reads a code representation of biometric data provided on a handheld device and a biometric reader that captures biometric images of an individual holding the handheld device.

Embodiments of the present invention provide a method including reading and storing live biometric data of an individual. The method also includes reading code data associated with a handheld device held by said individual, storing said read code data, and decoding said code data and storing said decoded data. The method further includes extracting live biometric data from said stored live biometric data and determining whether said extracted live biometric data matches with said decoded data.

Embodiments of the present invention provide a method for utilizing biometric and other data for identity verification utilizing a handheld, mobile reading and scanning device and handheld device.

Embodiments of the present invention include a method of confirming an identity of an individual using a reader/scanner device. The method includes reading fingerprint data of the individual and extracting minutia from said fingerprint data and saving said minutia in a memory. The method also includes reading a bar code on a handheld device held by the individual and storing said bar code data in said memory and converting said code data into decoded data, and storing said decoded data in said memory. The method further includes determining whether said minutia matches with said decoded data.

Further embodiments, features, and advantages of the invention, as well as the structure and operation of the various embodiments of invention, are described in detail below with reference to the accompanying drawings.

BRIEF DESCRIPTION OF THE DRAWINGS/ FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1A, 1B, and 1C are illustrations of three fingerprint images having different light levels.

Figure 1C:

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Embodiments of the present invention provide a reading and scanning device that scans and stores biometric data of an individual with a biometric scanner section. A reader section reads and stores machine readable code data with a code reading section. The machine readable code can be associated with a handheld device held by the individual having their biometric data scanned. The reading and scanning device then decodes the code data and stores decoded data. The biometric data is extracted, either within the reading and scanning device or remotely after being transmitted to a remote device. The extracted biometric data is compared to the decoded data, either within the reading and scanning device or remotely after the decoded data is transmitted to a remote device, to determine if the individual is the person listed on the handheld device. If not, the biometric data can be used to determine the person's identity if he/she is in a main database.

Through use of the handheld device, an individual can be identified or determined not to be the person shown on the handheld device. The code on the handheld device represents previously read and extracted biometric data on the individual. This would allow the reading and scanning and possible remote system to confirm the identity of a person quickly just based on the handheld device. If the handheld device does not belong to the person, then an additional step can be taken to check the live read biometric data against the main database to determine the individual's identity.

Terminology

The use of "biometric data" throughout the specification is meant to include all types of data that is imaged from a part of an individual, such as taking a image of a fingerprint on a camera as a bit map. The use of "extracted biometric data" is meant to include all types characteristics of extracted data obtained from the image or bit map, such as minutia of a fingerprint determined from the fingerprint image. Other examples can be retina imaging and extraction, limb length imaging and extraction, etc.

As used herein, the term "biometric scanner or fingerprint scanner" are used to refer to a scanner that scans a biometric or fingerprint and then processes the image data or transmits the image data to a host processor. Such a fingerprint scanner can be a remote fingerprint scanner where "remote" is meant to imply that the fingerprint scanning can take place at a location physically separate from the host processor. A remote fingerprint scanner and a host processor may be considered physically separate even though they may be connected through a data interface, permanent or otherwise. It is to be understood that any aspect of an individual's body that allows for biometric scanning can be scanned, thus the invention is not only limited to a fingerprint.

As used herein, the term "fingerprint capture event" is used to refer to a single act of capturing a fingerprint image with a fingerprint scanner. This term is not meant to imply any temporal limitations but is instead intended to refer to the event along with the particular characteristics of the event that can change from event to event. Such characteristics include the particular finger and its physical characteristics as well as other factors like the cleanliness of the image capture surface that can affect fingerprint capture.

As used herein, the term "fingerprint image" is used to refer to any type of detected fingerprint image including, but not limited to, an image of all or part of one or more fingerprints, toe prints, foot prints, a rolled fingerprint, a flat stationary fingerprint, a palm print, a hand print, and/or prints of multiple fingers or toes.

As used herein, the term "acceptable fingerprint image" is used to refer to a fingerprint image that has both acceptable darkness as well as acceptable definition. The particular acceptable darkness and definition levels are not critical and can be determined by one skilled in the relevant art given this disclosure, as discussed herein.

As used herein, the term "code" is used to refer to any type of machine readable code. Some examples can be one or two-dimensional bar codes. Also, the "handheld device" is used to refer to any type of smartcard device or identification device, such as a drivers license, government issued identification card, privately issued identification card, a privately or publically issued badge, etc.

Auto-Capture System

Figure 1B:
Figure 1A:

FIGS. 1A–1C are illustrations of three fingerprint images having different light levels. The fingerprint image in FIG. 1A is comparatively darker than those of FIGS. 1B and 1C. In a number of places in the fingerprint image of FIG. 1A, adjacent ridges are not discernable since the valleys between such ridges cannot be seen in the image. Such a situation occurs due to over-sensitivity of a camera for a particular reflected image, as will now be described in terms of a fingerprint scanner according to present invention.

Figure 2A:
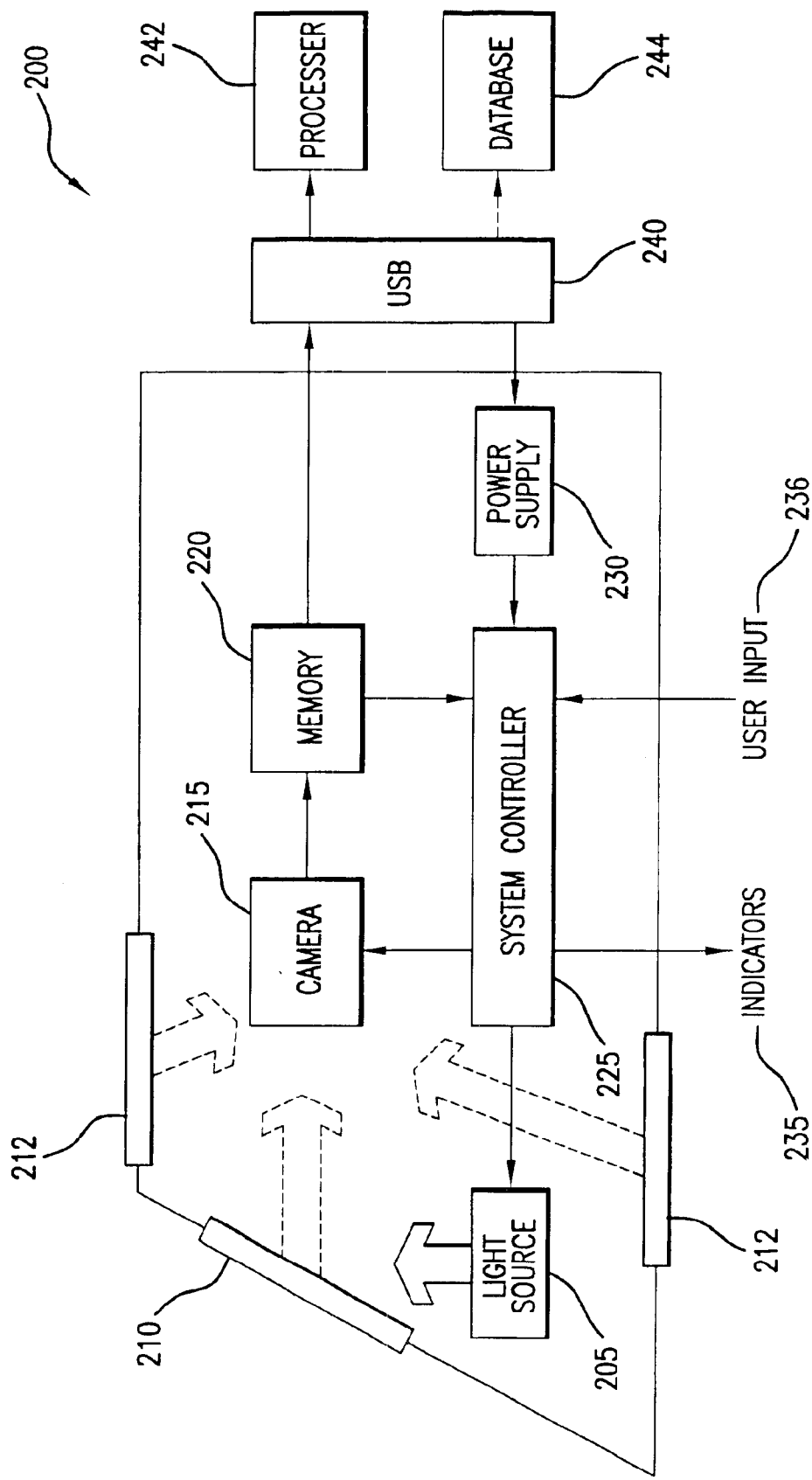
FIG. 2A is an illustration of a code reader and fingerprint scanner according to embodiments of the present invention.

FIG. 2A is an illustration of a device 200, which can be a code reader and fingerprint scanner, according to the present invention. Code reader and fingerprint scanner 200 includes a light source 205. Light source 205 can be one or more light emitting diodes (LEDs). Alternatively, light source 205 can be another type of light source suitable for use within a fingerprint scanner, as would be apparent to one skilled in the relevant art given this description. Light source 205 directs light toward a fingerprint capture surface 210. Fingerprint capture surface 210 is a transparent or semi-transparent material upon which a finger can be placed so as to cause light from light source 205 to be reflected towards a camera 215. Fingerprint capture surface 210 can be glass, though other materials apparent to one skilled in the relevant art can be used without departing from the scope of the present invention. Similar in make-up and function to a fingerprint capture surface 210, there is a code capture window 212. The code capture window 212 can be positioned anywhere on the outer surface of the code reader and fingerprint scanner 200, where only two alternative locations are shown for convenience.

As discussed above, the light reflected towards camera 215 by fingerprint capture surface 210 is representative of the contact of a finger with fingerprint capture surface 210. Specifically, contact of ridges on a finger with fingerprint capture surface 210 results in light being reflected in areas corresponding to that contact. Thus, the quality of the contact places a role in the quantity of reflected light. This contact quality is affected by the dryness of the subject's skin, the cleanliness of the fingerprint contact surface 210, the pressure applied by the subject, and the like. Camera 215 captures the reflected light within, for example, an array of photo-sensitive pixels. The image is then stored in a memory 220. Memory 220 can include both non-volatile and volatile memory. In one example, memory 220 includes non-volatile memory that stores the executable code necessary for device operation and volatile memory for storing data representative of the captured image. Any type of non-volatile memory may be used, for example an electrically-erasable read only memory (EEPROM) or an optically-erasable read only memory (Flash-EPROM), though the invention is not limited to these specific types of non-volatile memory. Volatile memory can be a random-access-memory for storing detected fingerprint images. For example, the image can be stored as an array of values representing a gray-scale value associated with each pixel. Other types of memory (flash memory, floppy drives, disks, mini-floppy drives, etc.) can be used in alternative embodiments of the present invention. Volatile memory can include mini-floppy drives (such as those available from Sandisk Corp. or Intel Corp.). In this way, multiple prints can be stored locally. This is especially important in border control, crime scene, and accident sight applications.

While camera 215 is responsive to light reflected from fingerprint capture surface 210, pixel light intensity is converted into a darkness level so that the stored image is like those appearing in FIGS. 1A–1C. In other words, the actual stored image is represented by dark pixels where light was depicted such that an image of the actual received light pattern would appear as a "negative" of what is shown in FIGS. 1A–1C. Alternatively, the stored image could correspond to actual light levels received, without departing from the scope of the present invention. Camera 215 can include a 1 inch×1 inch array of 500×500 pixels. Other size arrays could also be used, for example a 620×480 pixel array, without departing from the scope of the present invention. Camera 215 can be a CMOS square pixel array. For example, a CMOS camera manufactured by Motorola Corporation can be used. Camera 215 has a sensitivity to light that is controlled by an integration time. The integration time is the length of time the pixels in camera 215 collect light. A longer integration time means more light collected, and thus a brighter (or darker after conversion) image. Before discussing the remaining elements in the code reader and fingerprint scanner 200 of FIG. 2, the relationship between integration time and captured image will be discussed in connection with the fingerprint images of FIGS. 1A–1C.

The fingerprint images illustrated in FIGS. 1A–1C illustrate how the quality of a captured fingerprint can be affected by the integration time of the camera. The fingerprint image of FIG. 1A is darker than that of FIG. 1B. This increased darkness can be characterized as an over-sensitivity to light by the capturing camera (keeping in mind that the image received by the camera is the negative of the image shown in the figure). This over-sensitivity can be corrected by shortening the integration time. Thus, by simply shortening the integration time, an image like that of FIG. 1B can be produced for the same fingerprint capture event. The fingerprint image of FIG. 1B is superior in quality to that of FIG. 1A since the shorter integration times results in less saturation of pixels within the camera, while still capturing a high percentage of fingerprint images. Meanwhile, the fingerprint image of FIG. 1C is lighter than that of FIG. 1B. This can be characterized as an under-sensitivity to light by the capturing camera. This under-sensitivity results in the loss of several ridges throughout the captured image in FIG. 1C. As with FIG. 1A, the sensitivity of the capturing camera can be adjusted by changing its integration time. Thus, by lengthening the integration time of the capturing camera, more light can be collected and an image like FIG. 1B can be captured. Thus, FIGS. 1A–1C are representative of fingerprint images captured during a single fingerprint capture event at different integration times.

Two points should be noted about the images of FIGS. 1A–1C. The first is that the differences between the images is meant to illustrate changes in quality and in no way is intended to imply a particular level of quality required before an image is considered "acceptable." In other words, FIG. 1B is meant to illustrate an image with improved quality of images 1A and 1C, but is not meant to illustrate the quality needed to produce an acceptable fingerprint image. Fingerprint image acceptability is determined by particular light levels and ridge count details as can be determined through the darkness and ridge count tests discussed below. Thus, the fingerprint images of FIGS. 1A and 1C might be considered acceptable fingerprint images as that term is used herein. The second point to note is that the images of FIGS. 1A–1C correspond to a particular fingerprint capture event. The integration time corresponding to FIG. 1B could just as easily produce an image like that of FIG. 1A, in a subsequent fingerprint capture event. Since many of the variables that affect the quality of the captured fingerprint image vary between fingerprint capture events, optimal integration time should be determined each time a fingerprint image is captured, as discussed more fully elsewhere herein.

Returning to the code reader and fingerprint scanner 200 of FIG. 2A, system controller (also referred to herein as a processor) 225 is also included. System controller 225, using the executable code stored in memory 220, is capable of performing the necessary functions associated with device operation, such as image sensor control in response to user input. System controller 225 also performs the tests associated with reading a code and capturing an acceptable fingerprint image, as discussed more fully below.

As would be apparent to a person skilled in the art, other types of memory, circuitry and/or processing capability may be included within code reader and fingerprint scanner 200, examples of which include a frame grabber and an analog/digital converter. Also included in the code reader and fingerprint scanner 200 shown in FIG. 2 is a power supply 230, a Universal Serial Bus (USB) interface 240, indicators 235, and user input controls 236 (the latter two shown as indicators and buttons in FIGS. 2B and 2C). While a USB interface is used in connection with the preferred embodiments, the invention is not limited to such an interface. Any communications interface can be used. For example, an IEEE 1394 High Performance Serial Bus interface, RF interface, or even a proprietary interface may be used without departing from the scope of the present invention. The USB interface 240 is coupled to a processor 242 in a remote device, which in turn is coupled to a database 244. The database 244 may be within the remote device or linked to it through a network. In alternative embodiments, the database 244 may be coupled to the USB interface 240, as shown by a dashed line.

Similar to the discussion above in relation to the fingerprint capturing, a code image can be captured based on reflecting light from the light source 205 off a handheld device 250 (FIG. 2E) that includes machine readable code 252 (FIG. 2E) and receiving the reflected light at the camera 215. The light from light source 205 is transmitted in both directions through code capturing window 212. This code image is stored in the memory 220. The code image is also decoded by the system controller 225. The decoded data is also stored in the memory 220. The decoded data represents biometric data for an individual previously read, extracted, and stored as the machine readable code 252. By comparing the stored biometric data stored in code 252 to the live biometric data, a determination can be made whether the individual with the handheld device 250 is the person shown on the handheld device 250. In this way, even if an individual is not in a central database, a determination can be made whether or not they are the individual shown on the handheld device 250.

It is to be appreciated, the reading and scanning 200 may include separate light sources, cameras, memories, and controllers for the fingerprint system and the code reader system, which may be arranged based on the placement of the code reader window 212 or the fingerprint capture surface 210.

A discussion follows for a print and code capture and matching apparatus and routine according to embodiments of the present invention, as is shown in FIGS. 2B–2E and 7–8. After this discussion, an auto-capture method according to embodiments of the present invention, as shown in FIGS. 3–6, will be described.

Print and Code Capture and Matching Apparatus and Routine

Print and Code Capture and Matching Apparatus

Figure 2B:
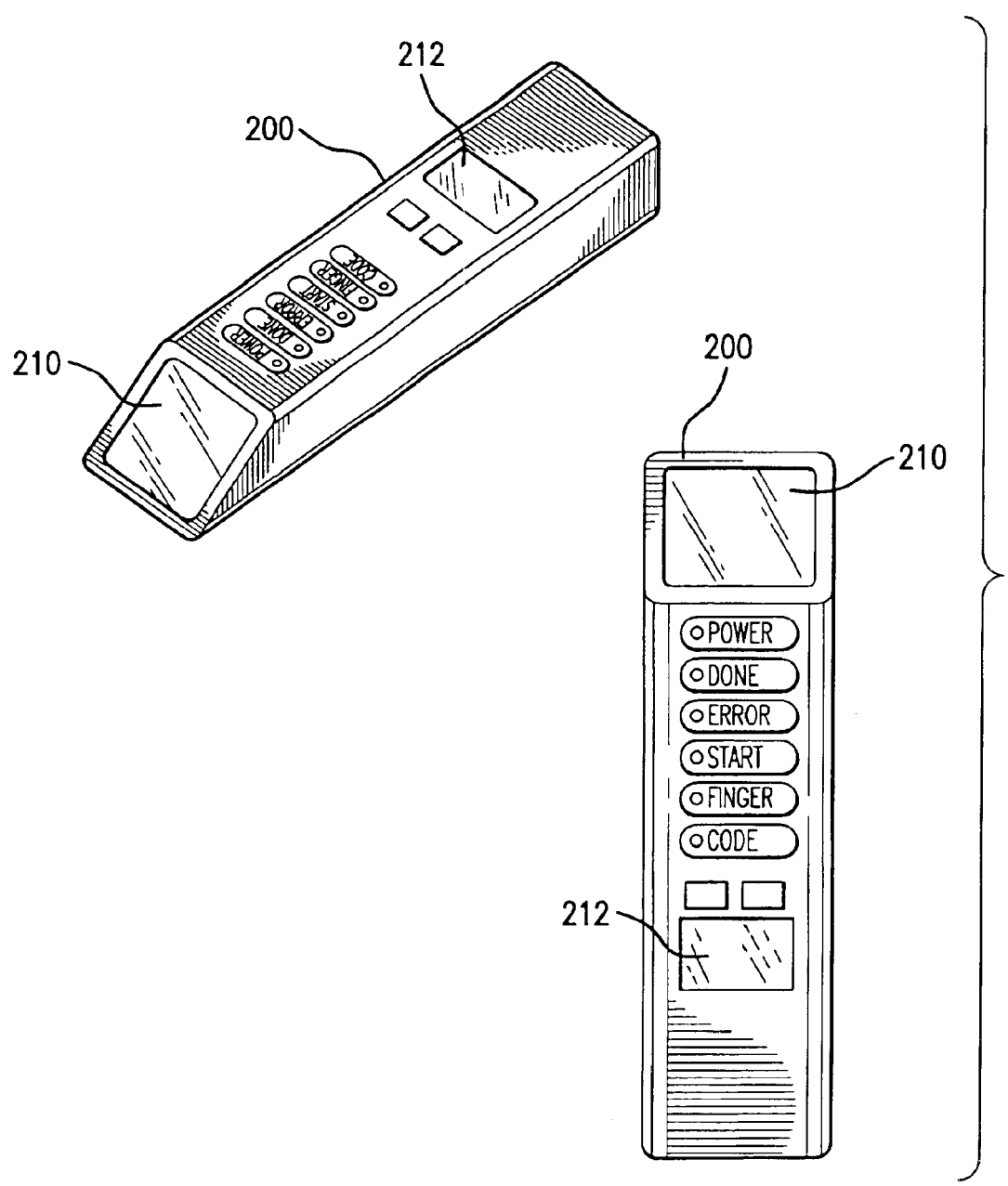
FIGS. 2B–2E illustrate an example of the outward appearance and use of a mobile, hand-held remote code reader and fingerprint scanner according to FIG. 2A.
Figure 2C:
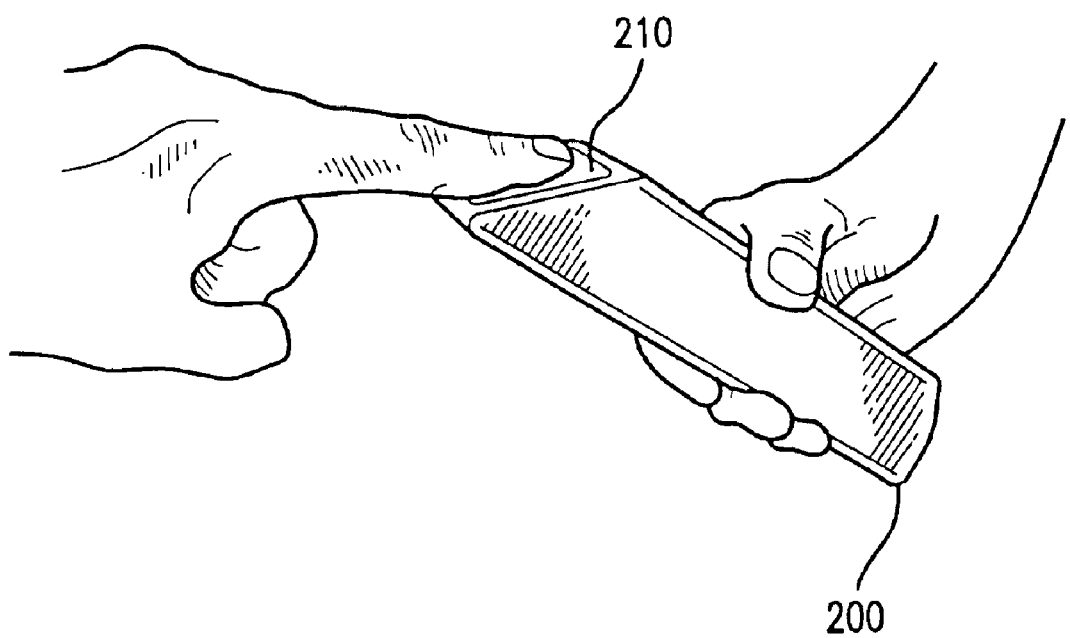
Figure 2D:
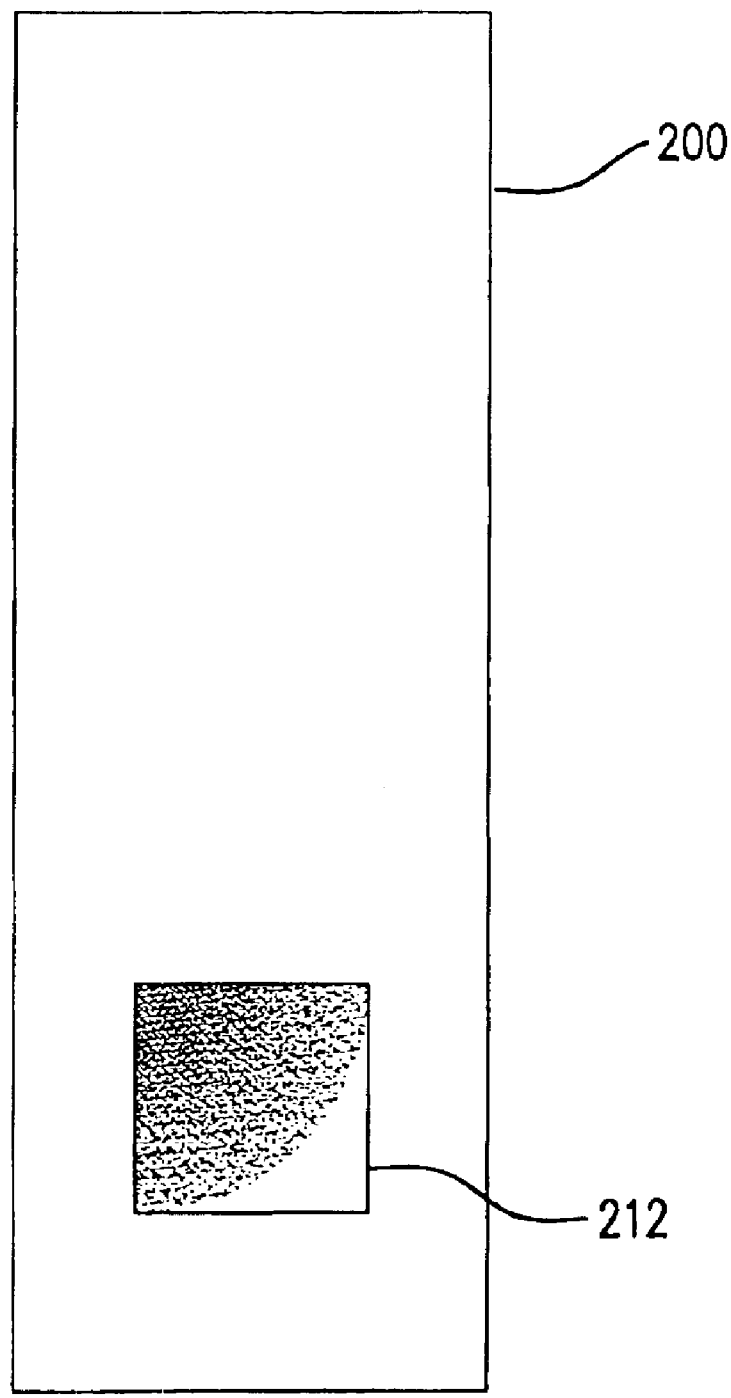
Figure 2E:
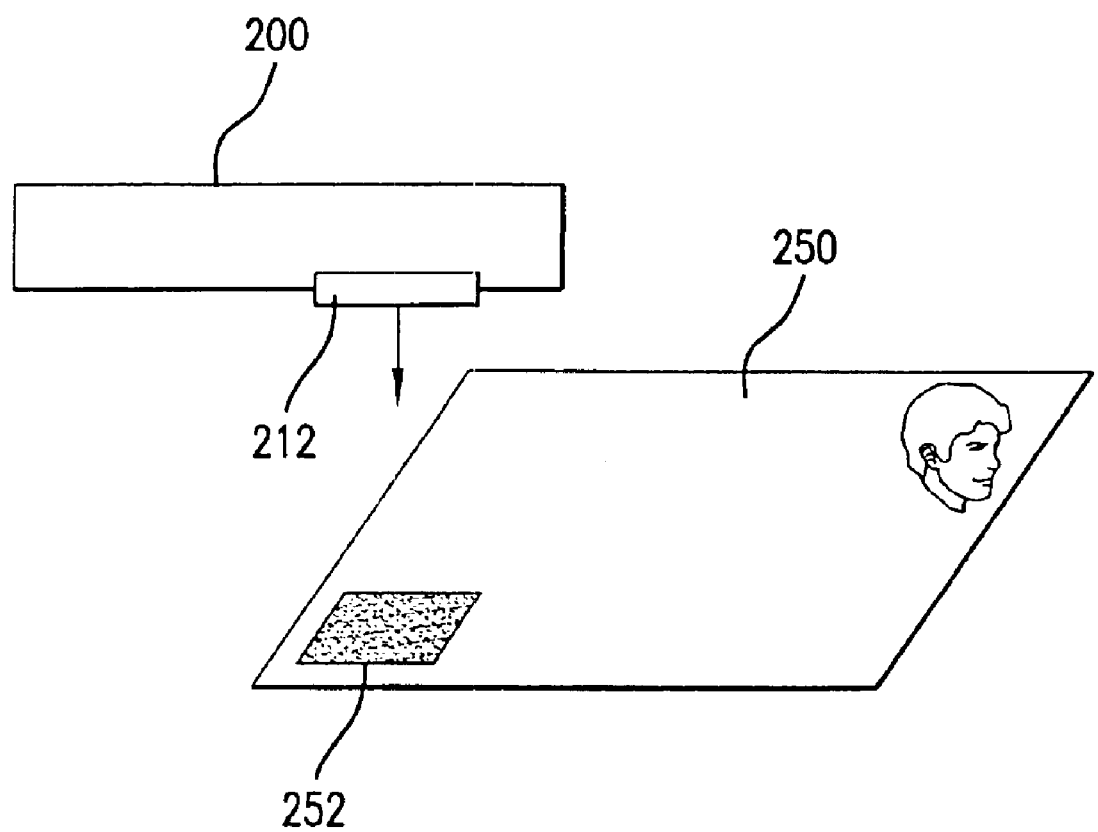

FIGS. 2B–2E illustrate an example of the outward appearance and use of a mobile, hand-held code reader and remote fingerprint scanner 200 according to FIG. 2A. A main difference between FIGS. 2B, 2C, and 2E compared to FIG. 2D is that in FIG. 2D the code reader window 212 is on a back of the reading and scanning device 200, while in the other figures the code reader window 212 is on a front of the reading and scanning 200.

Reading and scanning device 200 is ergonomically designed to fit the hand naturally. The oblong, cylindrical shape (similar to a flashlight), does not contain sharp edges. The device is small enough to be gripped by large or small hands without awkward or unnatural movement. The device is comfortable to use without muscle strain on the operator or subject. In one example, reading and scanning 200 is 1.5×8.0×1.5 inches (height×length×width), weighs about 340 grams (12 oz.), and has an image capture surface 210 size of about 1"×1".

The non-intimidating appearance of the reading and scanning device 200 is designed to resemble a typical flashlight—a device that is not generally threatening to the public. Reading and scanning device 200 has no sharp edges and is constructed of a light-weight aluminum housing that is coated with a polymer to give the device a "rubberized" feel. Because reading and scanning device 200 is small and lightweight, it may be carried on the officer's utility belt upon exiting a vehicle. The device is designed for one hand use, allowing the officer to have a free hand for protective actions. Reading and scanning device 200 is designed for harsh environments to sustain issues such as dramatic temperature changes and non-intentional abuse.

As seen in FIG. 2B, reading and scanning device 200 contains simple push buttons and set of six LED's that provide user activation and status indication. The user need only press one button to activate the unit and one button to activate either the fingerprint scanning function or the code reading function. In one embodiments, as discussed above, the buttons can be: POWER, DONE, ERROR, START, FINGER, and CODE.

With continuing reference to 2B, if a FINGER button is depressed, the fingerprint scanning function is activated. Then, the reading and scanning device 200 awaits a finger to be introduced to the fingerprint capture surface 210. The digital (or analog) image is automatically captured when an acceptable image is detected. The image is then tested for quality of data prior to notifying the operator with an indication (e.g., visual indication and/or audible tone) for acceptance. A routine for automatically capturing an acceptable fingerprint image can be performed in accordance with the present invention, as is discussed elsewhere herein. The unit emits a tone to indicate a completed process.

Still with reference to FIG. 2B, once the CODE button is depressed, the code reading function is activated. The reading and scanning device 200 then can read the code 252 on the handheld device 250 through window 212. A routine for capturing a code image, decoding the code image, and storing both the captured and decoded data can be performed in accordance with embodiments of the present invention, as is described below.

After performing the finger and code readings, an officer may introduce the unit 200 to a docking station, which can include the processor 242 and database 244, blindly, maintaining his eyes on the subject for safety. Once seated in the docking station, the fingerprint and code are automatically transferred to a mobile computer, which can include the processor 242 and the database 242, without operator intervention.

The detected image is scalable to conform to FBI provided software (cropped or padded to 512 pixels by 512 pixels), although the standard image size is 1"×1", 500 dpi, 256 levels of gray-scale (ANSI-NIST). Other details of an example reading and scanning device 200 can be found in U.S. Pat. No. 6,111,977 to Scott et al. and U.S. Published Application 2002/0021827-A1, to Scott et al., which are both incorporated herein by reference in their entirety.

Thus, reading and scanning device 200 can be held in either hand of a user, and used to capture both code data and a person's fingerprint to verify the person's identity. The fingerprint is captured from a cooperative individual (frontal approach) or an uncooperative individual (handcuffed subject—most commonly face down). Reading and scanning device 200 can be operated with one-hand, allowing the officer to have a hand ready for protective actions. The officer need not have fingerprinting knowledge to capture the fingerprint. If the individual's handheld device 250 is available, then the code 252 can also be easily read and transmitted.

As discussed above, the integration time of camera 215 within code reader and fingerprint scanner 200 can be adjusted to compensate for light level changes introduced by variations in the contact quality between a finger and the fingerprint capture surface during any particular fingerprint capture event. Such compensation can be done automatically, i.e. without operator input, within the code reader and fingerprint scanner 200 according to a method that will next be described.

Print and Code Capture and Matching Method

Figure 7:
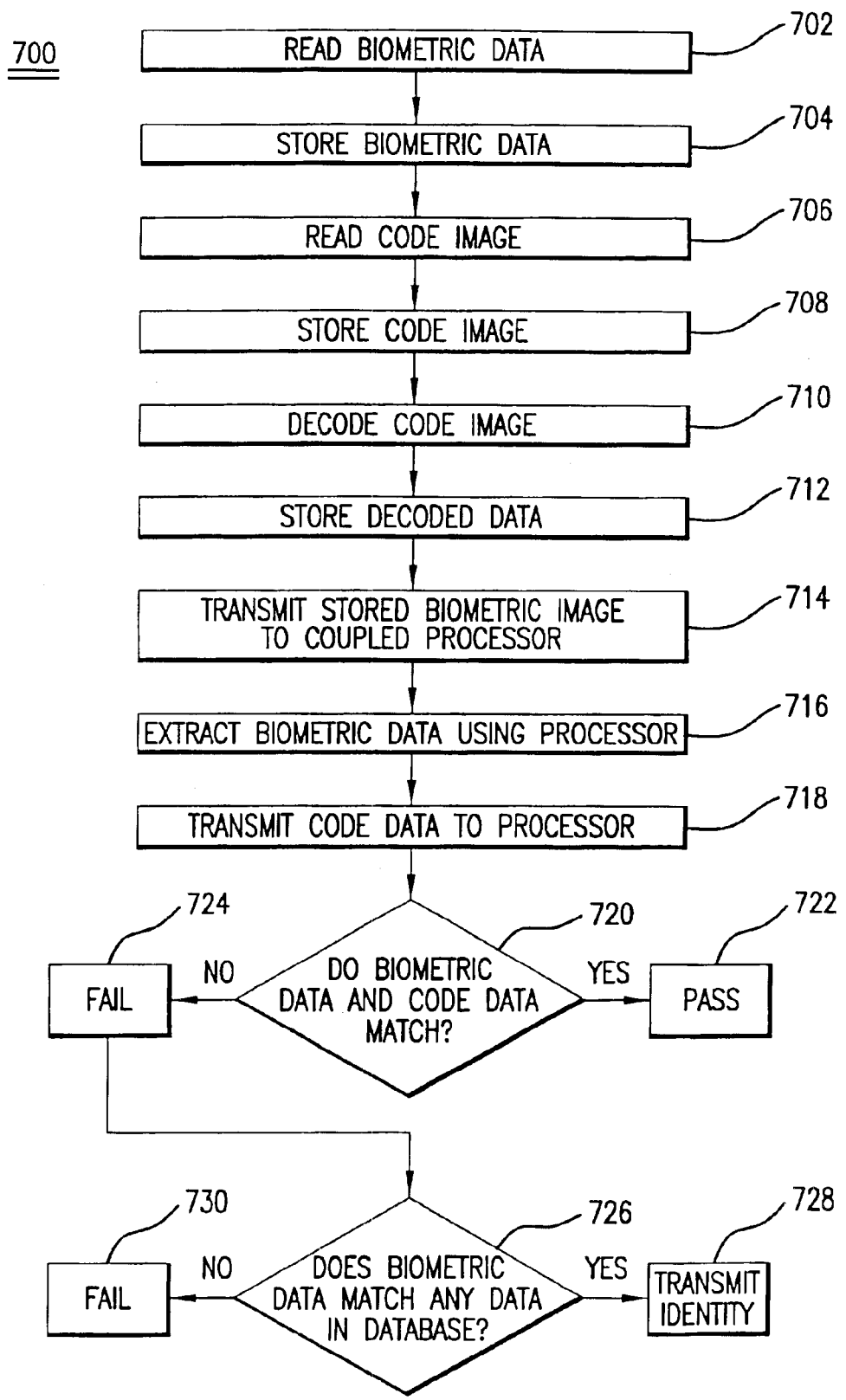
FIG. 7 illustrates a routine for capturing biometric and code data in accordance with embodiments of the present invention.

Turning to FIG. 7, a routine 700 for reading and matching biometric data and code data according to an embodiment of the present invention is shown. A biometric image is read through the surface 210 at step 702 and stored in memory 220 at step 704. A code image is read through window 212 at step 706 and stored in memory 220 at step 708. The code image is decoded at step 710 and the decoded data is stored in memory 220 at step 712. The biometric data is transmitted from the memory 220 via the USB port 240 at step 714. The transmitted biometric data is extracted at step 716. The decoded data is transmitted from the memory 220 via USB port 240 at step 718. A comparison is made between the decoded data and the extracted biometric data by the processor 242 at step 720 to see if they match. If they match a PASS signal is sent at step 722. If they do not match a FAIL signal is sent at step 724, and the extracted live biometric data is compared to all data in a database 244 to determine if it matches with any of the data in the database at step 726. If a match is found a MATCH signal is transmitted at step 728. If no match is found a FAIL signal is sent at step 730.

Figure 8:
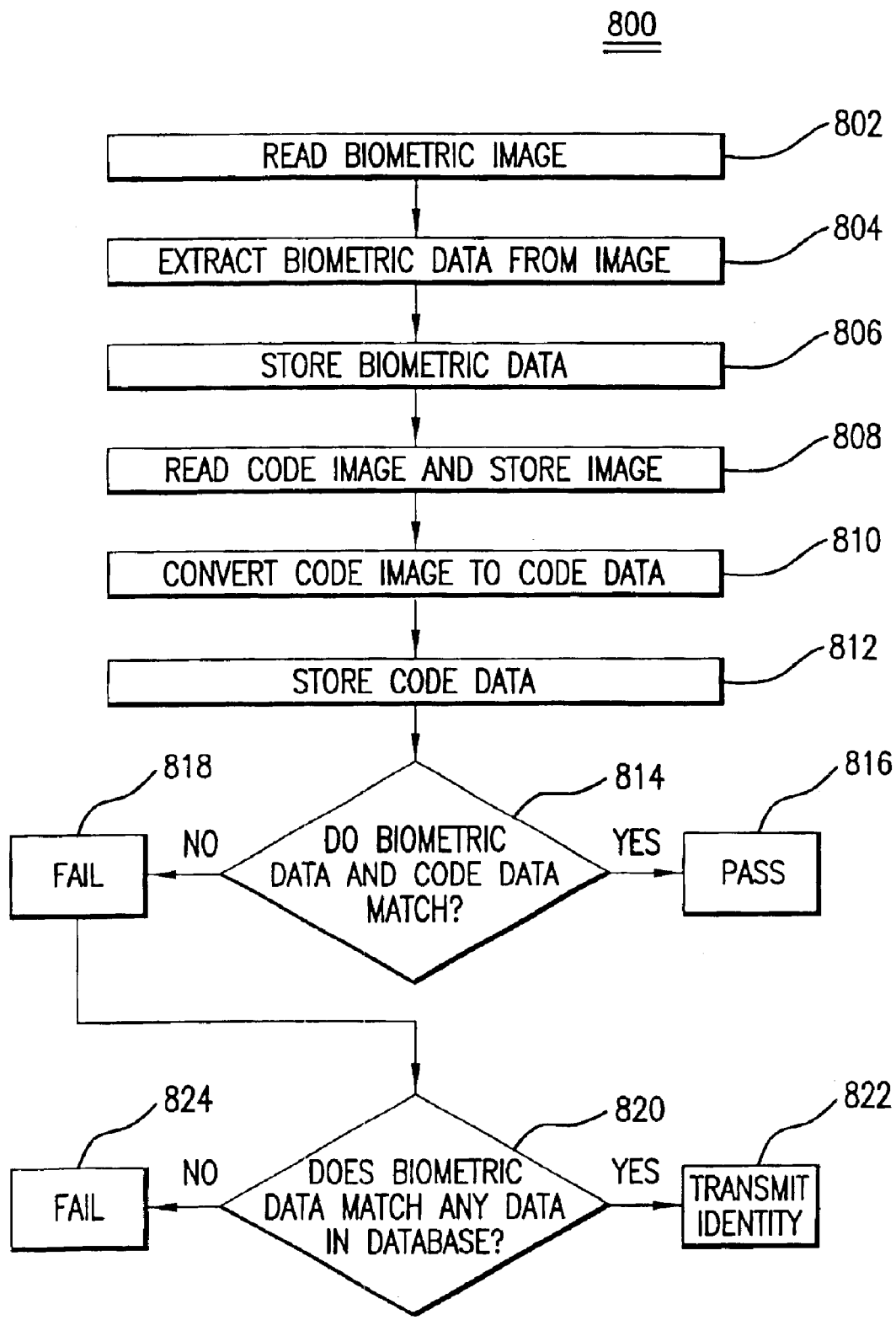
FIG. 8 illustrates a routine for capturing biometric and code data in accordance with embodiments of the present invention.

Another routine 800 for reading and matching biometric data and code data according to an embodiment of the present invention is shown in FIG. 8. Biometric data is read via the biometric reading surface 210 at step 802, extracted by the processor 225 at step 804, and stored in the memory 220 at step 806. Code data is read via the code reading window 212 and stored in the memory 220 at step 808. The code data image is converted to decoded data by the processor 225 at step 810. The decoded data is stored in memory 220 at step 812. A determination is made by processor 225 whether the extracted biometric data matches the decoded data at step 814. If they match a PASS signal is sent at step 816. If they do not match a FAIL signal is sent at step 818, and the extracted live biometric data is compared to all data in a database 244 to determine if it matches with any of the data in the database at step 820. If a match is found a MATCH signal is transmitted at step 822. If no match is found a FAIL signal is sent at step 824.

Auto-Capture Method

Figure 3:
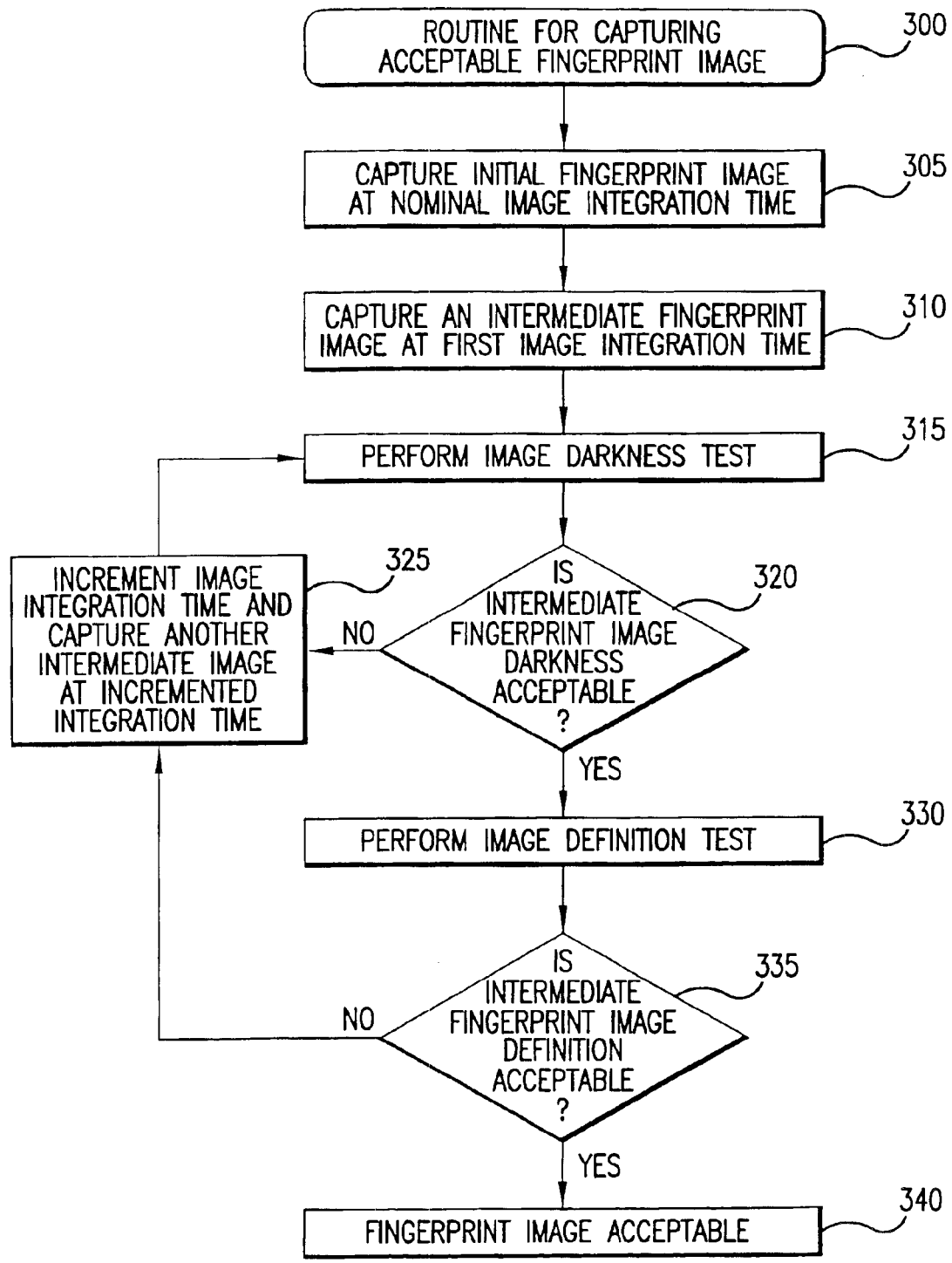
FIG. 3 is an illustration of a routine for capturing an acceptable fingerprint image according to an embodiment of the present invention.

FIG. 3 is an illustration of a routine 300 for capturing an acceptable fingerprint image according to an embodiment of the present invention. In a first step 305 an initial fingerprint image is captured at a nominal integration time. In the first step 305, the fingerprint scanner is "waiting" for the presence of a finger. Thus, the first step 305 involves the fingerprint scanner continually capturing images at the nominal integration time until the presence of a finger is detected. The presence of a finger is detected by performing a darkness test after each image is captured at the nominal integration time. Once the result of a darkness test is positive, meaning a fingerprint image with sufficient darkness has been detected, an initial fingerprint image has been captured, thus completing the first step 305. The darkness test used can be a darkness test according to the present invention, described below more fully in connection with FIGS. 4A and 4B. The nominal integration time can be an integration time expected to a capture an acceptable fingerprint image based on the intensity of the light source used and the sensitivity of the camera, discounting any variations due to the quality of the contact between the finger and fingerprint capture surface. Typically, there is a range of integration times associated with a given camera, for example from 20–120 milliseconds. The nominal integration time can thus be determined based on expected conditions in advance as a particular integration time from within the typical range for a given camera. For example, a typical nominal integration time can be 50 ms, though other nominal integration times could be chosen without departing from the scope of the present invention. For example, a nominal integration time from within the range of 40 ms to 60 ms could be selected for a camera with an integration time range of 20–120 ms.

In a next step 310 of the routine 300 shown in FIG. 3, an intermediate fingerprint image is captured at a first integration time. The present invention uses a set of integration times to find an optimal integration time once an initial fingerprint image is captured at the nominal integration time. The set of integration times can be derived from the nominal integration time. For example, the set of integration times can include six integration times that are each equal to the nominal integration time multiplied by an appropriate scaling factor. In an embodiment, the integration times can be equal to 6/7, 7/7, 8/7, 9/7, 10/7, and 11/7 multiplied by the nominal integration time. Thus, if the nominal integration time is selected to be 50 ms, the integration times used in a routine according to an embodiment of the present invention would be: 43 ms, 50 ms, 57 ms, 64 ms, 71 ms, and 79 ms. Thus, continuing with this example, once the initial image is captured at 50 ms, the integration time is shortened to 43 ms and an intermediate fingerprint image is captured. As will be discussed below, additional intermediate fingerprint images can be captured at higher integration times until an acceptable fingerprint image is captured. It should thus be apparent to one skilled in the relevant art that the particular integration times used are not critical, so long as a range of integration times around the nominal integration time is used.

In a next step 315 of the routine 300 of FIG. 3, an image darkness test of the intermediate image captured in step 310 is performed. Such an image darkness test is used to determine whether the intermediate image is sufficiently dark. An image darkness test of the present invention, as discussed below in connection with FIGS. 4A and 4B, can be used. Other image darkness tests could also be used without departing from the scope of the present invention. For example, simply averaging the values of all the pixels in the camera can give an indication of the darkness level of the captured intermediate image.

Depending on the outcome of the image darkness test performed in step 315, a next step 325 or 330 is performed as shown in FIG. 3 at 320. The particular level of darkness required for an acceptable darkness level is not critical and could be determined by one skilled in the relevant art given this disclosure. The acceptable darkness level can be environment and use specific and thus can be set by the manufacturer or user, as appropriate.

If the image darkness test of step 315 results in an un-acceptable darkness level, then a next step 325 of incrementing the image integration time and capturing another intermediate image at the incremented integration time is performed. The only exception to this step is when the integration time cannot be incremented to a higher integration time because the highest integration is the one at which the intermediate fingerprint image was captured. In such a case, the routine returns to step 305.

If the image integration time has been incremented and another intermediate image captured, the routine returns to step 315 to perform the darkness test again. Thus, routine 300 includes a loop with steps 315, 320, and 325 repeating until an intermediate image with an acceptable darkness level has been captured.

Once an intermediate fingerprint image with an acceptable darkness level has been captured, an image definition test is performed at a step 330. The image definition test used can be an image definition test according to the present invention and discussed below in connection with FIGS. 5A and 5B. Such an image definition test counts the number of ridges in predefined areas by focusing on pixel patterns that include minimum numbers of consecutive light and dark pixels generally representative of the presence of the ridges and valleys characteristic of a fingerprint image. Alternatively, any image definition test that tests the captured image for its level of detail can be used without departing from the scope of the present invention. The particular level of image definition required for an acceptable image definition level is not critical and could be determined by one skilled in the relevant art given this disclosure. The acceptable image definition level can be environment and use specific and thus can be set by the manufacturer or user, as appropriate.

Once the image definition test has been performed in step 330, one of two different steps are conducted based on the outcome of that test as shown at 335.

If the image definition test 330 indicated that the intermediate fingerprint was of un-acceptable definition, then the routine returns to step 325, discussed above. As with the above description of step 325, if the integration time cannot be incremented because the captured image was a result of the maximum integration time, routine 300 returns to step 305 to await a new initial fingerprint image.

If the image definition test 330 indicated that the intermediate fingerprint image was of acceptable definition, then intermediate finger print image is an acceptable fingerprint image in terms of both darkness as well as definition. Thus, in a final step 340, the intermediate fingerprint image that has passed both tests is an acceptable fingerprint image and the routine is complete. In this way, routine 300 has automatically captured an acceptable fingerprint image. Step 340 can include a step of providing a signal that an acceptable fingerprint image has been captured. This signal can be audible, visible, or both.

Details of an image darkness test and an image definition test in accordance of the present invention will now be described in terms of FIGS. 4A, 4B, 5A, and 5B.

Figure 4A:
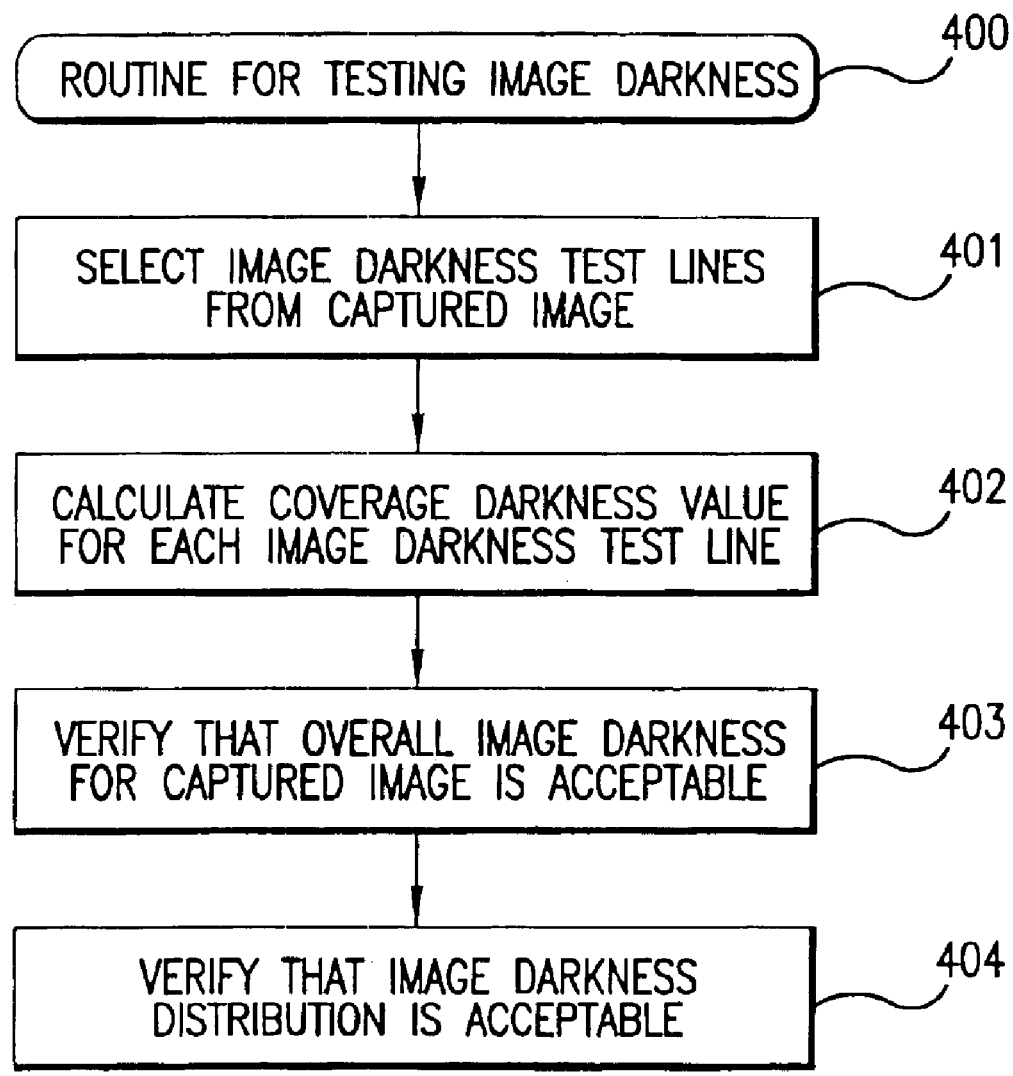
FIG. 4A illustrates a routine for testing image darkness 400 in accordance with embodiments of the present invention.
Figure 4B:
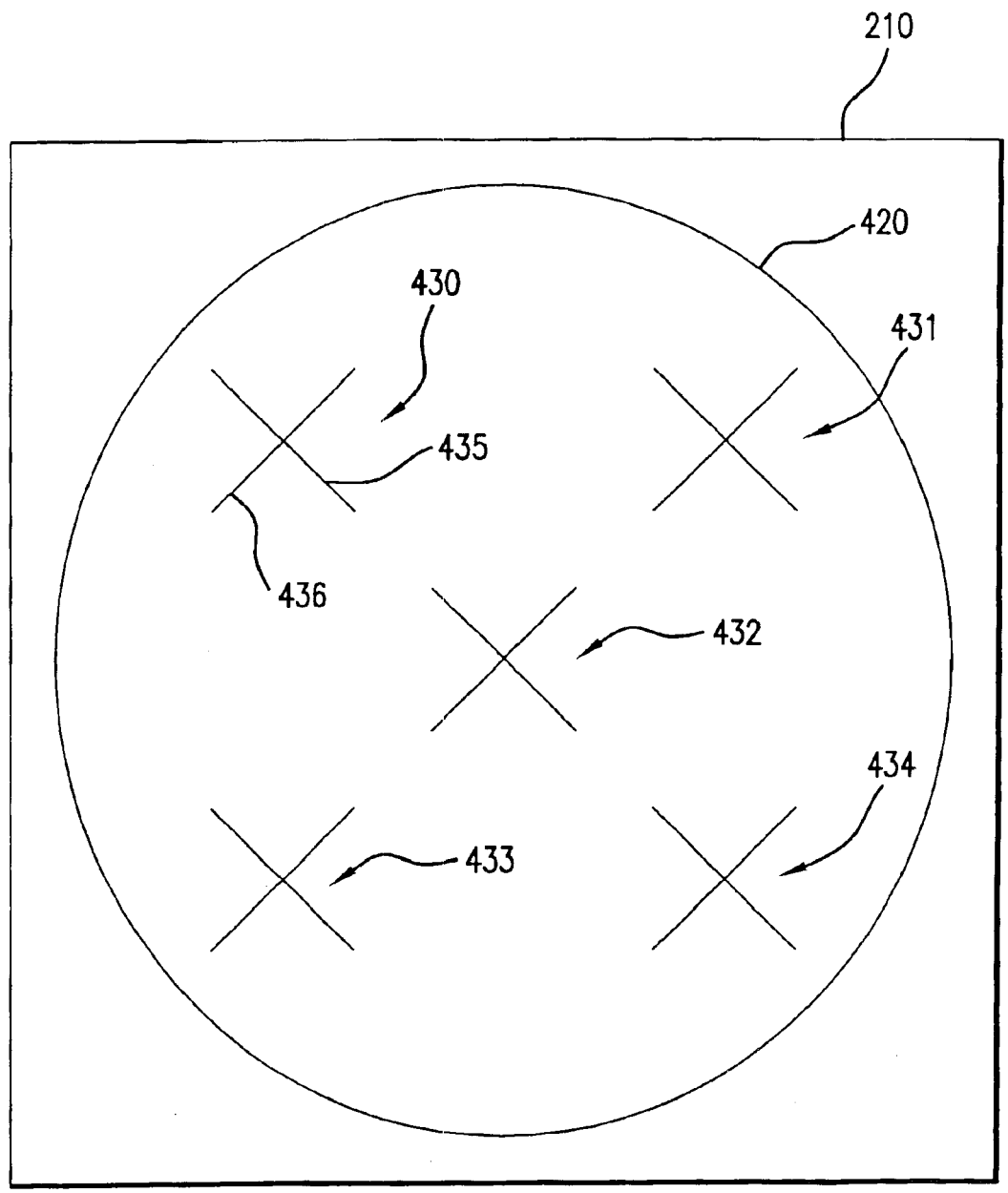
FIG. 4B illustrates an arrangement of image test lines used in an image darkness test according to embodiments of the present invention.

FIG. 4A illustrates a routine for testing image darkness 400 in accordance with the present invention. In a first step 401 of routine 400, image darkness test lines are selected from a captured image. Thus, rather than observing pixels from the entire image to determine darkness, only a few lines of pixels are selected. The present inventor has discovered that by selecting particular test lines, the image darkness test can not only ensure adequate image darkness from testing only a handful of lines, but can also ensure proper fingerprint placement on the image capture surface of a fingerprint scanner. FIG. 4B shows the details of such image test lines according to one example.

FIG. 4B illustrates an arrangement of image darkness test lines used in an image darkness test according to the present invention. In FIG. 4B, image capture surface 210 is depicted with an expected image capture area 420. Expected image capture area 420 is a region in which a fingerprint is expected to be located during an image capture event. The precise size and location of image capture area 420 can differ from that shown in the figure without departing from the scope of the invention. In order to ensure that the dark areas present during a darkness test are arranged in an expected area, image test lines are situated throughout expected image capture area 420. Specifically, in the arrangement of FIG. 4B, there are ten image test lines 435, 436, and the like. These ten image test lines are arranged in five pairs of image test lines 430–434. These five pairs of image test lines 430–434 are spaced throughout the expected image capture area 420 as shown in FIG. 4B. In an embodiment of the invention, each image test line 435, 436, is a diagonal arrangement of 32 pixels. Other numbers of pixels and arrangements of image test lines could be used without departing from the scope of the present invention.

In a next step 402 of the routine 400 shown in FIG. 4A, an average darkness value for each image darkness test line is calculated. Such an average can be calculated by adding the darkness value for each pixel in an image darkness test line and then dividing that sum by the number of pixels in the image darkness test line.

In a next step 403, acceptable overall image darkness is verified. This verification can be done, for example, by verifying that a predetermined number of image darkness test lines have an associated average image darkness level above a threshold darkness level. In an embodiment, the predetermined number (or percentage) of image darkness test lines is eight (or 80% of the image darkness test lines). If eight image darkness test lines have an average image darkness level above the threshold darkness level, the overall image darkness is considered acceptable. Other numbers (or percentages) of image darkness lines can be used without departing from the scope of the present invention. Likewise, the particular threshold darkness level chosen is not critical and could be determined by one skilled in the relevant art given this disclosure. The acceptable darkness level can be based on the specific environment in which the fingerprint scanner is used as well as requirements associated with the field in which the fingerprint scanner is used and thus can be set by the manufacturer or user, as appropriate.

Once overall image darkness has been verified as acceptable in step 403, a next step 404 of verifying acceptability of image darkness distribution is performed. It should be noted that if the previous step 403 resulted in a determination that overall image darkness was not acceptable for the tested image, it is not necessary that routine 400 continue, but could instead stop at step 403. In step 404, image darkness distribution is tested. Despite the determination in step 403 that overall image darkness was acceptable, this darkness may have been concentrated in a particular region. For example, if all image darkness test lines in pairs 430–433, as shown in FIG. 4B, have acceptable darkness levels, the image will have an acceptable overall image darkness despite a lack of acceptable darkness in both image darkness test lines in pair 434. Thus, step 404 is used to verify that the darkness of the image is distributed throughout the expected image capture area 420. The step can be performed by verifying that at least one image darkness test line in each of the five pairs 430–434 of image darkness test lines has an acceptable darkness level. As with step 403, this can be done by comparing the average darkness value of each darkness test line with a predetermined threshold darkness value. This threshold darkness value can be the same value used in connection with step 403. Likewise, as with step 403, the particular threshold darkness level chosen is not critical and could be determined by one skilled in the relevant art given this disclosure. The acceptable darkness level can be based on the specific environment in which the fingerprint scanner is used as well as requirements associated with the field in which the fingerprint scanner is used and thus can be set by the manufacturer or user, as appropriate.

Because step 404 of the routine 400 shown in FIG. 4A verifies that the image darkness is distributed throughout expected image capture region 420, the routine 400 of FIG. 4A can be used to verify acceptable darkness level throughout a particular region. Accordingly, such a routine 400 can be used as the image darkness test within the routine 300 shown in FIG. 3. Meanwhile, the image definition test 330 also shown in routine 300 can be performed with a routine like that shown in FIG. 5A.

Figure 5A:
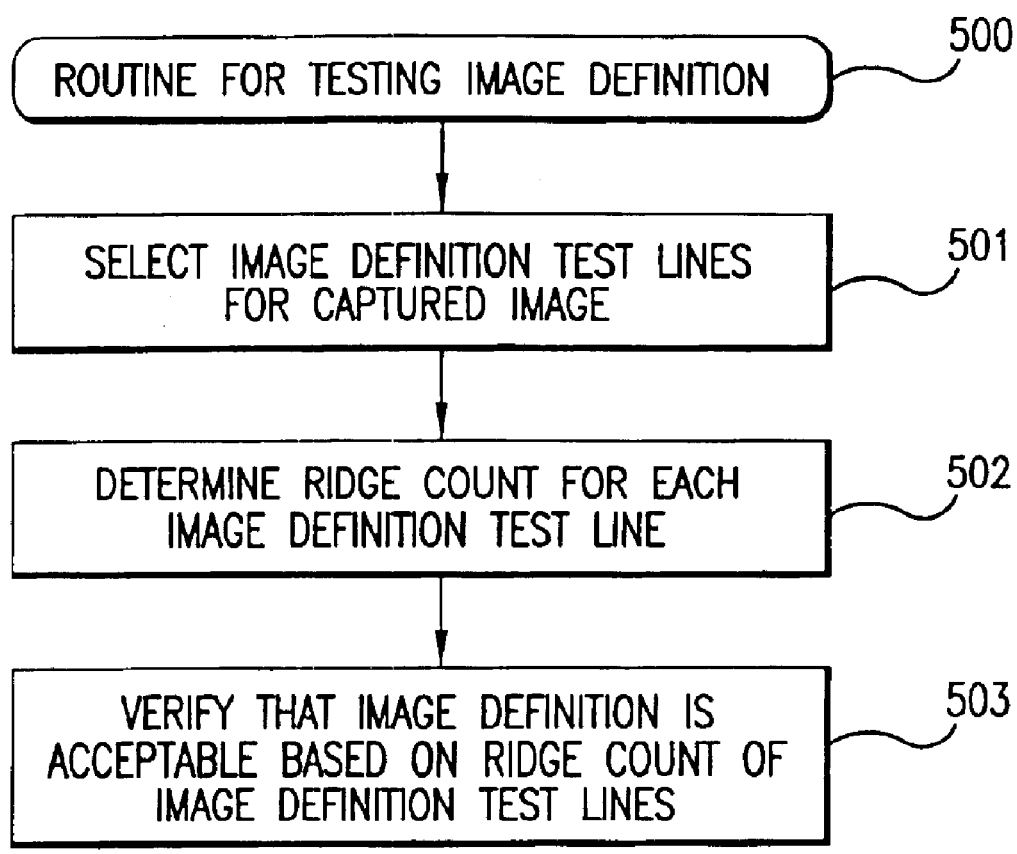
FIG. 5A is an illustration of a routine for testing image definition in accordance with embodiments of the present invention.

FIG. 5A is an illustration of a routine for testing image definition 500 in accordance with an embodiment of the present invention. While the routine 400 of FIG. 4A tested an image for an acceptable darkness level, the routine 500 of FIG. 5A tests an image for an acceptable level of definition. Such a test is useful because, for example, a particular image may be have an acceptable level of darkness while lacking the necessary ridge details characteristic of an acceptable fingerprint image. Thus, routine 500 tests an image for its definition level. Since a fingerprint image should have the dark ridges separated by light valleys characteristic of an acceptable fingerprint image, routine 500 tests for image definition by counting ridges and valleys along image definition test lines. In a first step 501 of the routine 500 of FIG. 5A, image definition test lines are selected from a captured image to be tested. This will be explained in connection with FIG. 5B.

Figure 5B:
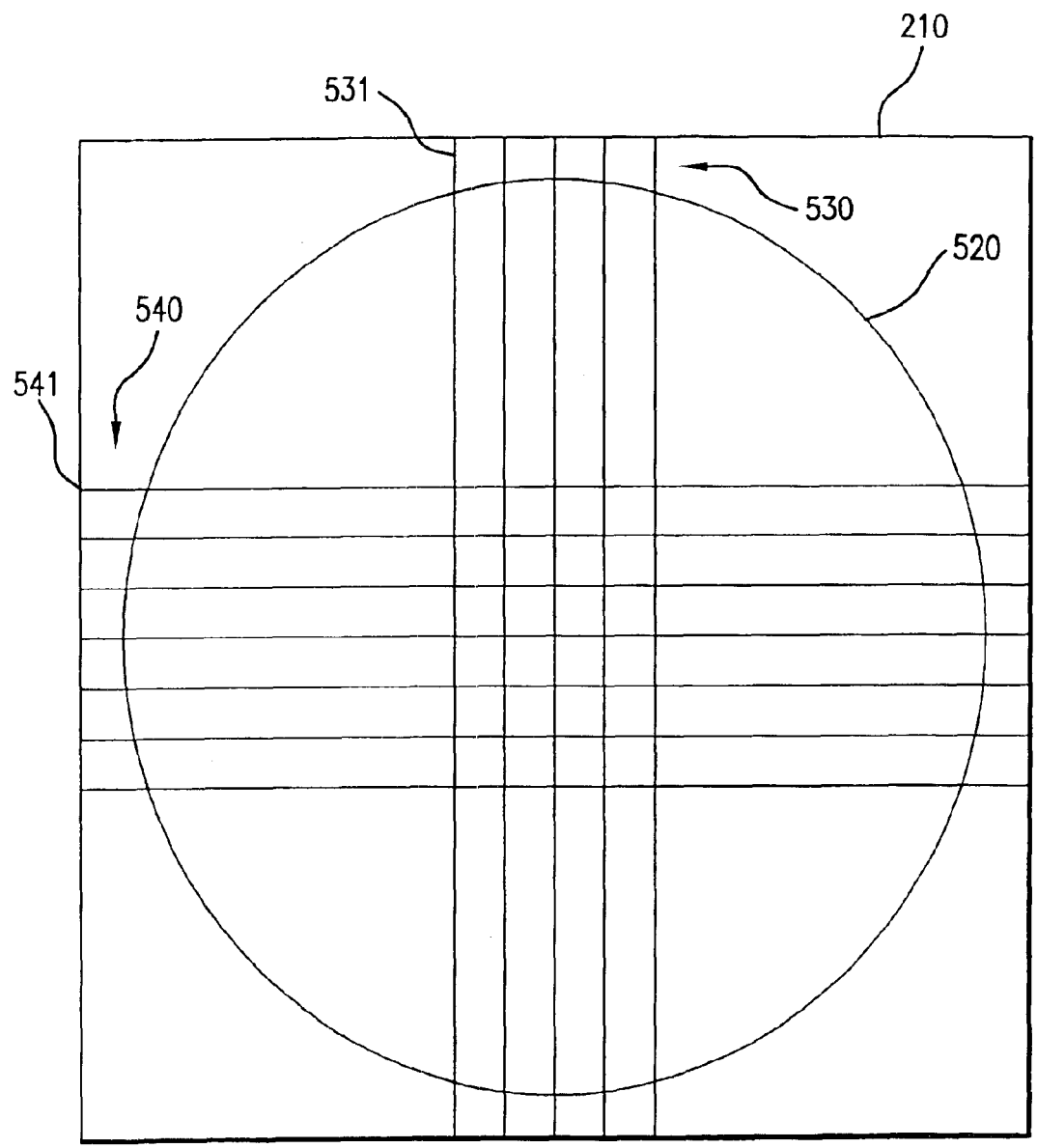
FIG. 5B illustrates an arrangement of image definition test lines used in an image definition test according to embodiments of the present invention.

FIG. 5B illustrates an arrangement of image definition test lines used in an image definition test according to the present invention. In FIG. 5B, image capture surface 210 is depicted with an expected image capture area 520. As with the arrangement shown in FIG. 4B, expected image capture area 520 is a region in which a fingerprint is expected to be located during an image capture event. The precise size and location of image capture area 520 can differ from that shown in the figure without departing from the scope of the invention. Within the image capture area 520 are arranged two groups 530, 540 of image definition test lines 531, 541, and the like. Each image definition test line is a line of pixels within the image capture area 520. The first group of image definition test lines 530 includes five vertically arranged parallel image definition test lines, e.g. 531. The second group of image definition test lines 540 includes seven horizontally arranged parallel image definition test lines, e.g. 541. While specific numbers of image definition test lines have been depicted, other numbers of image definition test lines could be used without departing from the scope of the present invention. Likewise, while the arrangement of image definition test lines has been selected in the arrangement of FIG. 5B to include more horizontally arranged lines than vertically arranged lines, different arrangements could be used without departing from the scope of the present invention.

In a next step 502 of the routine 500 shown in FIG. 5A, a ridge count for each image definition test line is determined. Such a ridge count can be determined by looking for a pattern of pixel undulations representative of an expected pattern of fingerprint ridges. In a fingerprint image, ridges are shown as adjacent dark areas separated from each other by intervening light areas representative of valleys. Thus, a line of pixels that includes a number of fingerprint ridges will include a substantially continuous group of comparatively dark pixels following by a substantially continuous group of comparatively light pixels. Whether a pixel is considered comparatively dark or light can be determined by selecting a mid-range light level. This mid-range light level can be a single light level or a range of light levels. A comparatively dark pixel is one that is on the dark side of this mid-range light level while a comparatively light pixel is one that is on the light side of this mid-range light level. Thus, a ridge can be determined by the presence of, for example, three or more continuous comparatively dark pixels bounded by, for example, three or more comparatively light pixels. In this way, the number of ridges within one image definition test line can be determined in step 502 by counting groups of comparatively dark pixels separated by groups of comparatively light pixels. The actual number of comparatively dark pixels necessary to define to a ridge could be determined by one skilled in the relevant arts given this disclosure.

In a final step 503, the ridge counts of the image definition test lines determined in step 502 are used to verify image definition acceptability. This can be done, for example, by verifying that the ridge count for each image definition test line is greater than a threshold ridge count value associated with each image definition test line. The particular threshold ridge count values used are not critical and could be determined by one skilled in the relevant art given this disclosure. Rather than having a threshold ridge count value for each image definition test line, a singe threshold ridge count value could be used for all the image definition test lines. As with acceptable image darkness, the acceptable image definition level can be based on the specific environment in which the fingerprint scanner is used as well as requirements associated with the field in which the fingerprint scanner is used and thus can be set by the manufacturer or user, as appropriate.

Companding Curves

Figure 6:
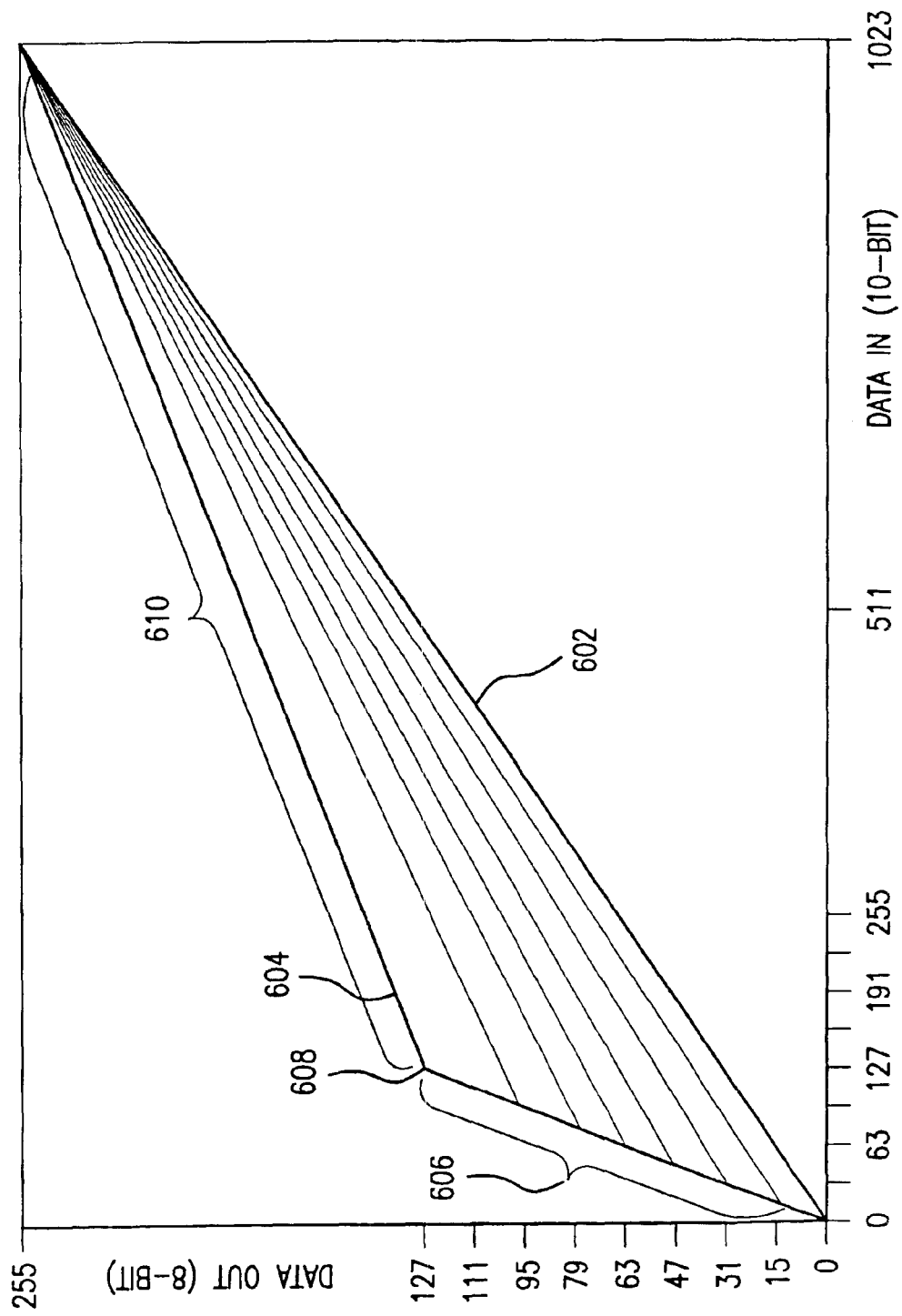
FIG. 6 shows a range of example companding curves.

In an embodiment, darkness level may be further changed based on a camera setting. The camera setting can be varied to adjust the integration time over a range of piecewise linear functions. The camera includes a set of look up tables that define the set of piecewise linear functions. For example, the set of piecewise linear functions may be companding curves, as used in a Motorola camera model number SCM20014. Companding curves allow for coring of lower order bits of captured image data. In effect, companding curves expand the value of lower signal levels, and compress higher signal levels, allowing for on-chip contrast adjustments. Furthermore, a companding function may perform data transformations, such as performing an 8-bit transformation on an incoming 10-bit data stream. FIG. 6 shows a range of example companding curves, that provide for an 10-bit to 8-bit transformation.

For example, as shown in FIG. 6, a first companding curve 602 may be linear, in which the output is divided by four. A second companding curve 604, has a first portion 606 that maintains a 1:1 I/O relationship up to a breakpoint 608. For a second portion 610 after breakpoint 608, a straight line equation may be used to transform the remaining input values. Any number of companding curve configurations are applicable to the present invention.

According to the present embodiment, one or more of steps 305 through 335 are performed on a first companding curve. The same steps are then performed on a second companding curve. This routine is repeated until the desired set of steps has been performed on all desired companding curves. For example, steps 305, 310, 315, 320, and 325 may be performed on all desired companding curves. Alternatively, steps 305, 310, 315, 320, 325, 330, 335 may be performed on all desired companding curves.

A user may select the set of companding curves to be used in a particular fingerprint image capturing system application, or a set of companding curves may be determined automatically, such as by a computer system. In this way, an acceptable fingerprint image is captured, having an image integration time and a companding curve selected to capture an optimum acceptable fingerprint image.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for identification based on a 1:1 comparison and 1:N comparison, comprising:

(a) capturing live biometric data of an individual;

(b) capturing code data associated with a handheld device, the code data identifying an authorized individual;

(c) decoding said code data;

(d) extracting live biometric data from said captured live biometric data;

(e) comparing said extracted live biometric data to said decoded data to perform the 1:1 comparison;

(f) determining, based on step (e), when a first condition occurs indicating a successful match and when a second condition occurs indicating an unsuccessful match; and (g) when the second condition occurs indicating the unsuccessful match, performing said 1:N comparison by comparing extracted live biometric data to pre-stored data in a database representing extracted biometric data for multiple individuals to determine if the extracted live biometric data matches with any of said pre-stored data representing the extracted biometric data for the multiple individuals in said database.

2. The method of claim 1, wherein steps (a) and (b) are performed using one device.

3. The method of claim 1, wherein said code data is machine readable code.

4. The method of claim 1, wherein said code data is one-dimensional bar code.

5. The method of claim 1, wherein said code data is two-dimensional bar code.

6. The method of claim 1, wherein said code data corresponds to biometric data.

7. The method of claim 1, wherein said biometric image corresponds to a fingerprint of said individual.

8. The method of claim 1, wherein said handheld device is an identification device.

9. The method of claim 1, wherein said handheld device is a smartcard.

10. The method of claim 1, wherein step (b) comprises reading a machine readable code.

11. The method of claim 1, wherein step (b) comprises reading a bar code.

12. The method of claim 1, further comprising the steps of:

performing step (d) after transmitting said captured live biometric data to a remote device; and performing steps (e)–(g) in said remote device.

13. The method of claim 1, wherein step (e) always consists of performing the second operation when the first operation is unsuccessful.

14. A method, comprising:

(a) capturing live biometric data of an individual using a handheld device;

(b) capturing code data associated with an identification device held by the individual by using the handheld device, the code data identifying an authorized individual;

(c) decoding the code data;

(d) extracting live biometric data from the captured live biometric data;

(e) transmitting the decoded code data and the extracted biometric data to a remote device;

(f) comparing the extracted live biometric data to the decoded data in the remote device using a 1:1 comparison to determine if a match results; and (g) when step (f) is unsuccessful, performing a 1:N comparison in the remote device by comparing the extracted live biometric data to pre-stored data in a database representing extracted biometric data for multiple individuals to determine if the extracted live biometric data matches with any of the pre-stored data representing extracted biometric data for multiple individuals in the database, wherein step (g) is always performed when step (f) is unsuccessful.

15. A method, comprising:

(a) capturing live biometric data of an individual;

(b) capturing code data associated with a handheld device, the code data identifying an authorized individual;

(c) decoding the code data;

(d) extracting live biometric data from the captured live biometric data;

(e) comparing the extracted live biometric data to the decided code data using a 1:1 comparison;

(f) determining whether a successful condition or an unsuccessful condition has occurred, wherein
the successful condition occurs when the extracted live biometric data matches with the decoded data, and
the unsuccessful condition occurs when the extracted live biometric data fails to match with the decoded data; and (g) when the unsuccessful condition occurs, comparing the extracted live biometric data to pre-stored data in a database representing extracted biometric data for multiple individuals using a 1:N comparison to determine if the extracted live biometric data matches with any of the pre-stored data representing extracted biometric data for multiple individuals in the database, wherein step (f) is always performed when step (e) is unsuccessful.

* * * * *

UNITED STATES PATENT AND TRADEMARK OFFICE
CERTIFICATE OF CORRECTION

PATENT NO. : 7,073,711 B2
APPLICATION NO. : 10/419093
DATED : July 11, 2006
INVENTOR(S) : Fernandez et al.

It is certified that error appears in the above-identified patent and that said Letters Patent is hereby corrected as shown below:

Title Page
Item[56], References Cited, U.S. Patent Documents, please replace "4,152,056 A 5/1979 Swonger et al." with --4,152,056 A 5/1979 Fowler--.

Item[56], References Cited, U.S. Patent Documents, please replace "4,210,889 A 7/1980 Holce" with --4,210,889 A 7/1980 Swonger et al.--.

Item[56], References Cited, U.S. Patent Documents, please replace "6,347,162 B1 2/2002 Suzuki" with --6,347,163 B2 2/2002 Roustaei--.

Item[56], References Cited, Foreign Patent Documents, please replace "EP 0 379 331 A1 7/1990" with --EP 0 379 333 A1 7/1990--.

Signed and Sealed this

Second Day of January, 2007

JON W. DUDAS
*Director of the United States Patent and Trademark Office*